United States Patent
Curtis

(10) Patent No.: US 8,434,024 B2
(45) Date of Patent: *Apr. 30, 2013

(54) SYSTEM AND METHOD FOR AUTOMATICALLY AND GRAPHICALLY ASSOCIATING PROGRAMMATICALLY-GENERATED MEDIA ITEM RECOMMENDATIONS RELATED TO A USER'S SOCIALLY RECOMMENDED MEDIA ITEMS

(75) Inventor: Scott Curtis, Durham, NC (US)

(73) Assignee: Napo Enterprises, LLC, Portsmouth, NH (US)

( * ) Notice: Subject to any disclaimer, the term of this patent is extended or adjusted under 35 U.S.C. 154(b) by 217 days.

This patent is subject to a terminal disclaimer.

(21) Appl. No.: 13/076,880

(22) Filed: Mar. 31, 2011

(65) Prior Publication Data

US 2012/0072846 A1 Mar. 22, 2012

Related U.S. Application Data

(63) Continuation of application No. 11/696,849, filed on Apr. 5, 2007, now Pat. No. 8,112,720.

(51) Int. Cl.
*G06F 3/048* (2006.01)
*G06F 3/01* (2006.01)

(52) U.S. Cl.
USPC ........... 715/811; 715/786; 715/810; 715/829; 715/833; 715/835

(58) Field of Classification Search .................. 715/786, 715/810, 811, 829, 833, 835, 853, 968
See application file for complete search history.

(56) References Cited

U.S. PATENT DOCUMENTS

| | | | |
|---|---|---|---|
| 4,870,579 | A | 9/1989 | Hey |
| 5,621,456 | A | 4/1997 | Florin et al. |
| 5,771,778 | A | 6/1998 | MacLean, IV |

(Continued)

FOREIGN PATENT DOCUMENTS

| | | | |
|---|---|---|---|
| CN | 1208930 A | 2/1999 | |
| EP | 0898278 A2 | 2/1999 | |

(Continued)

OTHER PUBLICATIONS

"YouTube—Broadcast Yourself.," http://www.youtube.com/, copyright 2007 YouTube, LLC, printed Oct. 26, 2007, 2 pages.

(Continued)

*Primary Examiner* — Nicholas Augustine

(57) ABSTRACT

A system and method for automatically, programmatically generating media item recommendations on a graphical user interface (GUI) based on a friend media item recommendation selected by a user. In the preferred embodiment, a selected media item recommendation is displayed in the GUI. Received friend media item recommendations are displayed in a list in relevance order adjacent to the selected media item. A programmatically-generated media item recommendation list is automatically generated based on relevance to the selected media item and displayed in another adjacent area to the selected media item recommendation. In this manner, a user can easily play the selected media item recommendation, and then browse the friend media item recommendations and the automatically updated programmatically-generated media item recommendations, which are both provided in their own respective adjacent areas, in order of closest relationship to the selected media item recommendation, at anytime.

44 Claims, 10 Drawing Sheets

U.S. PATENT DOCUMENTS

| | | |
|---|---|---|
| 5,956,027 A | 9/1999 | Krishnamurthy |
| 5,960,437 A | 9/1999 | Krawchuk et al. |
| 5,963,916 A | 10/1999 | Kaplan |
| 6,134,552 A | 10/2000 | Fritz et al. |
| 6,195,657 B1 | 2/2001 | Rucker et al. |
| 6,266,649 B1 | 7/2001 | Linden et al. |
| 6,314,420 B1 | 11/2001 | Lang et al. |
| 6,317,722 B1 | 11/2001 | Jacobi et al. |
| 6,353,823 B1 | 3/2002 | Kumar |
| 6,388,714 B1 | 5/2002 | Schein et al. |
| 6,438,579 B1 | 8/2002 | Hosken |
| 6,498,955 B1 | 12/2002 | McCarthy et al. |
| 6,526,411 B1 | 2/2003 | Ward |
| 6,567,797 B1 | 5/2003 | Schuetze et al. |
| 6,587,127 B1 | 7/2003 | Leeke et al. |
| 6,587,850 B2 | 7/2003 | Zhai |
| 6,609,253 B1 | 8/2003 | Swix et al. |
| 6,615,208 B1 | 9/2003 | Behrens et al. |
| 6,629,104 B1 | 9/2003 | Parulski et al. |
| 6,636,836 B1 | 10/2003 | Pyo |
| 6,654,786 B1 | 11/2003 | Fox et al. |
| 6,662,231 B1 | 12/2003 | Drosset et al. |
| 6,670,537 B2 | 12/2003 | Hughes et al. |
| 6,691,162 B1 * | 2/2004 | Wick ............................ 709/224 |
| 6,694,482 B1 | 2/2004 | Arellano et al. |
| 6,757,517 B2 | 6/2004 | Chang |
| 6,757,691 B1 | 6/2004 | Welsh et al. |
| 6,801,909 B2 | 10/2004 | Delgado et al. |
| 6,865,565 B2 | 3/2005 | Rainsberger et al. |
| 6,904,264 B1 | 6/2005 | Frantz |
| 6,912,528 B2 | 6/2005 | Homer |
| 6,941,275 B1 | 9/2005 | Swierczek |
| 6,941,324 B2 | 9/2005 | Plastina et al. |
| 6,947,922 B1 | 9/2005 | Glance |
| 6,973,475 B2 | 12/2005 | Kenyon et al. |
| 6,976,228 B2 * | 12/2005 | Bernhardson ................. 715/830 |
| 6,986,136 B2 | 1/2006 | Simpson et al. |
| 6,987,221 B2 | 1/2006 | Platt |
| 6,990,453 B2 | 1/2006 | Wang et al. |
| 7,013,301 B2 | 3/2006 | Holm et al. |
| 7,035,871 B2 | 4/2006 | Hunt et al. |
| 7,047,406 B2 | 5/2006 | Schleicher et al. |
| 7,072,846 B1 | 7/2006 | Robinson |
| 7,072,886 B2 | 7/2006 | Salmenkaita et al. |
| 7,075,000 B2 | 7/2006 | Gang et al. |
| 7,076,553 B2 | 7/2006 | Chan et al. |
| 7,089,248 B1 | 8/2006 | King et al. |
| 7,096,234 B2 | 8/2006 | Plastina et al. |
| 7,120,619 B2 | 10/2006 | Drucker et al. |
| 7,139,757 B1 | 11/2006 | Apollonsky et al. |
| 7,145,678 B2 | 12/2006 | Simpson et al. |
| 7,171,174 B2 | 1/2007 | Ellis et al. |
| 7,177,872 B2 | 2/2007 | Schwesig et al. |
| 7,219,145 B2 | 5/2007 | Chmaytelli et al. |
| 7,222,187 B2 | 5/2007 | Yeager et al. |
| 7,240,358 B2 | 7/2007 | Horn et al. |
| 7,283,992 B2 | 10/2007 | Liu et al. |
| 7,296,032 B1 | 11/2007 | Beddow |
| 7,305,449 B2 | 12/2007 | Simpson et al. |
| 7,340,481 B1 | 3/2008 | Baer et al. |
| 7,437,364 B1 | 10/2008 | Fredricksen et al. |
| 7,441,041 B2 | 10/2008 | Williams et al. |
| 7,444,339 B2 | 10/2008 | Matsuda et al. |
| 7,463,890 B2 | 12/2008 | Herz et al. |
| 7,469,283 B2 | 12/2008 | Eyal et al. |
| 7,496,623 B2 | 2/2009 | Szeto et al. |
| 7,509,291 B2 | 3/2009 | McBride et al. |
| 7,512,658 B2 | 3/2009 | Brown et al. |
| 7,523,156 B2 | 4/2009 | Giacalone, Jr. |
| 7,548,915 B2 | 6/2009 | Ramer et al. |
| 7,590,546 B2 | 9/2009 | Chuang |
| 7,594,246 B1 * | 9/2009 | Billmaier et al. ............... 725/52 |
| 7,614,006 B2 | 11/2009 | Molander |
| 7,623,843 B2 | 11/2009 | Squibbs |
| 7,627,644 B2 | 12/2009 | Slack-Smith |
| 7,644,166 B2 | 1/2010 | Appelman et al. |
| 7,653,654 B1 | 1/2010 | Sundaresan |
| 7,676,753 B2 | 3/2010 | Bedingfield |
| 7,680,959 B2 | 3/2010 | Svendsen |
| 7,720,871 B2 | 5/2010 | Rogers et al. |
| 7,725,494 B2 | 5/2010 | Rogers et al. |
| 7,730,216 B1 | 6/2010 | Issa et al. |
| 7,751,773 B2 | 7/2010 | Linden |
| 7,761,399 B2 | 7/2010 | Evans |
| 7,765,192 B2 | 7/2010 | Svendsen |
| 7,805,129 B1 | 9/2010 | Issa et al. |
| 7,827,110 B1 | 11/2010 | Wieder |
| 7,865,522 B2 | 1/2011 | Purdy et al. |
| 7,970,922 B2 | 6/2011 | Svendsen |
| 8,112,720 B2 | 2/2012 | Curtis |
| 2001/0013009 A1 | 8/2001 | Greening et al. |
| 2001/0021914 A1 | 9/2001 | Jacobi et al. |
| 2001/0025259 A1 | 9/2001 | Rouchon |
| 2002/0052207 A1 | 5/2002 | Hunzinger |
| 2002/0052674 A1 | 5/2002 | Chang et al. |
| 2002/0052873 A1 | 5/2002 | Delgado et al. |
| 2002/0082901 A1 | 6/2002 | Dunning et al. |
| 2002/0087382 A1 | 7/2002 | Tiburcio |
| 2002/0103796 A1 | 8/2002 | Hartley |
| 2002/0108112 A1 | 8/2002 | Wallace et al. |
| 2002/0116533 A1 | 8/2002 | Holliman et al. |
| 2002/0138836 A1 | 9/2002 | Zimmerman |
| 2002/0165793 A1 | 11/2002 | Brand et al. |
| 2002/0178057 A1 | 11/2002 | Bertram et al. |
| 2002/0194325 A1 | 12/2002 | Chmaytelli et al. |
| 2002/0194356 A1 | 12/2002 | Chan et al. |
| 2003/0001907 A1 * | 1/2003 | Bergsten et al. ............... 345/853 |
| 2003/0005074 A1 | 1/2003 | Herz et al. |
| 2003/0014407 A1 | 1/2003 | Blatter et al. |
| 2003/0018799 A1 | 1/2003 | Eyal |
| 2003/0046399 A1 | 3/2003 | Boulter et al. |
| 2003/0055516 A1 | 3/2003 | Gang et al. |
| 2003/0055657 A1 | 3/2003 | Yoshida et al. |
| 2003/0066068 A1 | 4/2003 | Gutta et al. |
| 2003/0069806 A1 | 4/2003 | Konomi et al. |
| 2003/0084044 A1 | 5/2003 | Simpson et al. |
| 2003/0084086 A1 | 5/2003 | Simpson et al. |
| 2003/0084151 A1 | 5/2003 | Simpson et al. |
| 2003/0089218 A1 | 5/2003 | Gang et al. |
| 2003/0097186 A1 | 5/2003 | Gutta et al. |
| 2003/0115167 A1 | 6/2003 | Sharif et al. |
| 2003/0135513 A1 | 7/2003 | Quinn et al. |
| 2003/0137531 A1 | 7/2003 | Katinsky et al. |
| 2003/0149581 A1 | 8/2003 | Chaudhri et al. |
| 2003/0149612 A1 | 8/2003 | Berghofer et al. |
| 2003/0153338 A1 | 8/2003 | Herz et al. |
| 2003/0160770 A1 | 8/2003 | Zimmerman |
| 2003/0191753 A1 | 10/2003 | Hoch |
| 2003/0225834 A1 * | 12/2003 | Lee et al. ....................... 709/204 |
| 2003/0229537 A1 | 12/2003 | Dunning et al. |
| 2003/0232614 A1 | 12/2003 | Squibbs |
| 2003/0236582 A1 | 12/2003 | Zamir et al. |
| 2003/0237093 A1 | 12/2003 | Marsh |
| 2004/0003392 A1 | 1/2004 | Trajkovic et al. |
| 2004/0019497 A1 | 1/2004 | Volk et al. |
| 2004/0034441 A1 | 2/2004 | Eaton et al. |
| 2004/0073919 A1 | 4/2004 | Gutta |
| 2004/0088271 A1 | 5/2004 | Cleckler |
| 2004/0091235 A1 | 5/2004 | Gutta |
| 2004/0107821 A1 | 6/2004 | Alcalde et al. |
| 2004/0128286 A1 | 7/2004 | Yasushi et al. |
| 2004/0133657 A1 | 7/2004 | Smith et al. |
| 2004/0133908 A1 | 7/2004 | Smith et al. |
| 2004/0133914 A1 | 7/2004 | Smith et al. |
| 2004/0162783 A1 | 8/2004 | Gross |
| 2004/0162830 A1 | 8/2004 | Shirwadkar et al. |
| 2004/0177116 A1 * | 9/2004 | McConn et al. ............... 709/204 |
| 2004/0181540 A1 | 9/2004 | Jung et al. |
| 2004/0186733 A1 | 9/2004 | Loomis et al. |
| 2004/0199527 A1 | 10/2004 | Morain et al. |
| 2004/0215793 A1 | 10/2004 | Ryan et al. |
| 2004/0216108 A1 | 10/2004 | Robbin |
| 2004/0224638 A1 | 11/2004 | Fadell et al. |
| 2004/0252604 A1 | 12/2004 | Johnson et al. |
| 2004/0254911 A1 | 12/2004 | Grasso et al. |
| 2004/0260778 A1 | 12/2004 | Banister et al. |
| 2004/0267604 A1 | 12/2004 | Gross |

| | | | | | |
|---|---|---|---|---|---|
| 2005/0020223 A1 | 1/2005 | Ellis et al. | 2006/0265409 A1 | 11/2006 | Neumann et al. |
| 2005/0021420 A1 | 1/2005 | Michelitsch et al. | 2006/0265503 A1 | 11/2006 | Jones et al. |
| 2005/0021470 A1 | 1/2005 | Martin et al. | 2006/0265637 A1 | 11/2006 | Marriott et al. |
| 2005/0021678 A1 | 1/2005 | Simyon et al. | 2006/0271959 A1 | 11/2006 | Jacoby et al. |
| 2005/0022239 A1 | 1/2005 | Meuleman | 2006/0271961 A1 | 11/2006 | Jacoby et al. |
| 2005/0026559 A1 | 2/2005 | Khedouri | 2006/0273155 A1 | 12/2006 | Thackson |
| 2005/0038819 A1 | 2/2005 | Hicken et al. | 2006/0277098 A1 | 12/2006 | Chung et al. |
| 2005/0038876 A1 | 2/2005 | Chaudhuri | 2006/0282304 A1 | 12/2006 | Bedard et al. |
| 2005/0060264 A1 | 3/2005 | Schrock et al. | 2006/0282776 A1 | 12/2006 | Farmer et al. |
| 2005/0060666 A1 | 3/2005 | Hoshino et al. | 2006/0282856 A1 | 12/2006 | Errico et al. |
| 2005/0065976 A1 | 3/2005 | Holm et al. | 2006/0288041 A1 | 12/2006 | Plastina et al. |
| 2005/0071418 A1 | 3/2005 | Kjellberg et al. | 2006/0293909 A1 | 12/2006 | Miyajima et al. |
| 2005/0091107 A1 | 4/2005 | Blum | 2007/0005793 A1 | 1/2007 | Miyoshi et al. |
| 2005/0120053 A1 | 6/2005 | Watson | 2007/0008927 A1 | 1/2007 | Herz et al. |
| 2005/0125221 A1 | 6/2005 | Brown et al. | 2007/0014536 A1 | 1/2007 | Hellman |
| 2005/0125222 A1 | 6/2005 | Brown et al. | 2007/0022437 A1 | 1/2007 | Gerken |
| 2005/0131866 A1 | 6/2005 | Badros | 2007/0028171 A1 | 2/2007 | MacLaurin |
| 2005/0138198 A1 | 6/2005 | May | 2007/0033292 A1 | 2/2007 | Sull et al. |
| 2005/0154608 A1 | 7/2005 | Paulson et al. | 2007/0043766 A1 | 2/2007 | Nicholas et al. |
| 2005/0154764 A1 | 7/2005 | Riegler et al. | 2007/0044010 A1 | 2/2007 | Sull et al. |
| 2005/0154767 A1 | 7/2005 | Sako | 2007/0064626 A1 | 3/2007 | Evans |
| 2005/0158028 A1 | 7/2005 | Koba | 2007/0078714 A1 | 4/2007 | Ott et al. |
| 2005/0166245 A1 | 7/2005 | Shin et al. | 2007/0078832 A1 | 4/2007 | Ott, IV et al. |
| 2005/0197961 A1 | 9/2005 | Miller et al. | 2007/0079352 A1 | 4/2007 | Klein, Jr. |
| 2005/0204309 A1* | 9/2005 | Szeto .................... 715/811 | 2007/0083471 A1 | 4/2007 | Robbin et al. |
| 2005/0228830 A1 | 10/2005 | Plastina et al. | 2007/0083553 A1 | 4/2007 | Minor |
| 2005/0246391 A1 | 11/2005 | Gross | 2007/0083929 A1 | 4/2007 | Sprosts et al. |
| 2005/0251455 A1 | 11/2005 | Boesen | 2007/0094081 A1 | 4/2007 | Yruski et al. |
| 2005/0251807 A1 | 11/2005 | Weel | 2007/0094082 A1 | 4/2007 | Yruski et al. |
| 2005/0256756 A1 | 11/2005 | Lam et al. | 2007/0094083 A1 | 4/2007 | Yruski et al. |
| 2005/0256866 A1* | 11/2005 | Lu et al. .................. 707/5 | 2007/0094363 A1 | 4/2007 | Yruski et al. |
| 2005/0267944 A1 | 12/2005 | Little, II | 2007/0100904 A1 | 5/2007 | Casey et al. |
| 2005/0278377 A1 | 12/2005 | Mirrashidi et al. | 2007/0106672 A1 | 5/2007 | Sighart et al. |
| 2005/0278758 A1 | 12/2005 | Bodlaender | 2007/0106693 A1 | 5/2007 | Houh et al. |
| 2005/0286546 A1 | 12/2005 | Bassoli et al. | 2007/0118425 A1 | 5/2007 | Yruski et al. |
| 2005/0289236 A1 | 12/2005 | Hull et al. | 2007/0118657 A1 | 5/2007 | Kreitzer et al. |
| 2006/0004640 A1 | 1/2006 | Swierczek | 2007/0118802 A1 | 5/2007 | Gerace et al. |
| 2006/0004704 A1 | 1/2006 | Gross | 2007/0118853 A1 | 5/2007 | Kreitzer et al. |
| 2006/0008256 A1 | 1/2006 | Khedouri et al. | 2007/0118873 A1 | 5/2007 | Houh et al. |
| 2006/0010167 A1 | 1/2006 | Grace et al. | 2007/0130008 A1 | 6/2007 | Brown et al. |
| 2006/0015378 A1 | 1/2006 | Mirrashidi et al. | 2007/0130012 A1 | 6/2007 | Yruski et al. |
| 2006/0020662 A1 | 1/2006 | Robinson | 2007/0152502 A1 | 7/2007 | Kinsey et al. |
| 2006/0026048 A1 | 2/2006 | Kolawa et al. | 2007/0162502 A1 | 7/2007 | Thomas et al. |
| 2006/0031510 A1* | 2/2006 | Beck et al. ............. 709/226 | 2007/0169148 A1 | 7/2007 | Oddo et al. |
| 2006/0048059 A1 | 3/2006 | Etkin | 2007/0195373 A1 | 8/2007 | Singh |
| 2006/0053080 A1 | 3/2006 | Edmonson et al. | 2007/0198485 A1 | 8/2007 | Ramer et al. |
| 2006/0053279 A1* | 3/2006 | Coueignoux ............ 713/154 | 2007/0199014 A1 | 8/2007 | Clark et al. |
| 2006/0064716 A1 | 3/2006 | Sull et al. | 2007/0214182 A1 | 9/2007 | Rosenberg |
| 2006/0074750 A1 | 4/2006 | Clark et al. | 2007/0214259 A1 | 9/2007 | Ahmed et al. |
| 2006/0083119 A1 | 4/2006 | Hayes | 2007/0220081 A1 | 9/2007 | Hyman |
| 2006/0085383 A1 | 4/2006 | Mantle et al. | 2007/0233736 A1 | 10/2007 | Xiong et al. |
| 2006/0100924 A1 | 5/2006 | Tevanian, Jr. | 2007/0238427 A1 | 10/2007 | Kraft et al. |
| 2006/0126135 A1 | 6/2006 | Stevens et al. | 2007/0239724 A1 | 10/2007 | Ramer et al. |
| 2006/0130120 A1 | 6/2006 | Brandyberry et al. | 2007/0244880 A1 | 10/2007 | Martin et al. |
| 2006/0143236 A1 | 6/2006 | Wu | 2007/0245245 A1 | 10/2007 | Blue et al. |
| 2006/0156242 A1 | 7/2006 | Bedingfield | 2007/0264982 A1 | 11/2007 | Nguyen et al. |
| 2006/0167991 A1 | 7/2006 | Heikes et al. | 2007/0265870 A1 | 11/2007 | Song et al. |
| 2006/0173910 A1 | 8/2006 | McLaughlin | 2007/0269169 A1 | 11/2007 | Stix et al. |
| 2006/0174277 A1 | 8/2006 | Sezan et al. | 2007/0277202 A1 | 11/2007 | Lin et al. |
| 2006/0190616 A1 | 8/2006 | Mayerhofer et al. | 2007/0282949 A1 | 12/2007 | Fischer et al. |
| 2006/0195479 A1 | 8/2006 | Spiegelman et al. | 2007/0288546 A1 | 12/2007 | Rosenberg |
| 2006/0195512 A1 | 8/2006 | Rogers et al. | 2007/0299873 A1 | 12/2007 | Jones et al. |
| 2006/0195513 A1 | 8/2006 | Rogers et al. | 2007/0299874 A1 | 12/2007 | Neumann et al. |
| 2006/0195514 A1 | 8/2006 | Rogers et al. | 2007/0299978 A1 | 12/2007 | Neumann et al. |
| 2006/0195515 A1 | 8/2006 | Beaupre et al. | 2008/0005179 A1 | 1/2008 | Friedman et al. |
| 2006/0195516 A1 | 8/2006 | Beaupre | 2008/0010372 A1 | 1/2008 | Khedouri et al. |
| 2006/0195521 A1 | 8/2006 | New et al. | 2008/0016098 A1 | 1/2008 | Frieden et al. |
| 2006/0195789 A1 | 8/2006 | Rogers et al. | 2008/0016205 A1 | 1/2008 | Svendsen |
| 2006/0195790 A1 | 8/2006 | Beaupre et al. | 2008/0032723 A1 | 2/2008 | Rosenberg |
| 2006/0200435 A1 | 9/2006 | Flinn et al. | 2008/0033959 A1 | 2/2008 | Jones |
| 2006/0206582 A1 | 9/2006 | Finn | 2008/0040313 A1 | 2/2008 | Schachter |
| 2006/0218187 A1 | 9/2006 | Plastina et al. | 2008/0046948 A1 | 2/2008 | Verosub |
| 2006/0224757 A1 | 10/2006 | Fang et al. | 2008/0052371 A1 | 2/2008 | Partovi et al. |
| 2006/0227673 A1 | 10/2006 | Yamashita et al. | 2008/0052380 A1 | 2/2008 | Morita et al. |
| 2006/0242201 A1 | 10/2006 | Cobb et al. | 2008/0052630 A1 | 2/2008 | Rosenbaum et al. |
| 2006/0247980 A1 | 11/2006 | Mirrashidi et al. | 2008/0059422 A1 | 3/2008 | Tenni et al. |
| 2006/0248209 A1 | 11/2006 | Chiu et al. | 2008/0059576 A1 | 3/2008 | Liu et al. |
| 2006/0253417 A1 | 11/2006 | Brownrigg et al. | 2008/0085769 A1 | 4/2008 | Lutnick et al. |
| 2006/0259355 A1 | 11/2006 | Farouki et al. | 2008/0091771 A1 | 4/2008 | Allen et al. |

| | | |
|---|---|---|
| 2008/0120501 A1 | 5/2008 | Jannink et al. |
| 2008/0133601 A1 | 6/2008 | Martin Cervera et al. |
| 2008/0133763 A1 | 6/2008 | Clark et al. |
| 2008/0134039 A1 | 6/2008 | Fischer et al. |
| 2008/0134043 A1 | 6/2008 | Georgis et al. |
| 2008/0134053 A1 | 6/2008 | Fischer |
| 2008/0141136 A1 | 6/2008 | Ozzie et al. |
| 2008/0147482 A1 | 6/2008 | Messing et al. |
| 2008/0147711 A1 | 6/2008 | Spiegelman et al. |
| 2008/0147876 A1 | 6/2008 | Campbell et al. |
| 2008/0160983 A1 | 7/2008 | Poplett et al. |
| 2008/0176562 A1 | 7/2008 | Howard |
| 2008/0181536 A1 | 7/2008 | Linden |
| 2008/0189336 A1 | 8/2008 | Prihodko |
| 2008/0189391 A1 | 8/2008 | Koberstein et al. |
| 2008/0189655 A1 | 8/2008 | Kol et al. |
| 2008/0195657 A1 | 8/2008 | Naaman et al. |
| 2008/0195664 A1 | 8/2008 | Maharajh et al. |
| 2008/0208823 A1 | 8/2008 | Hicken |
| 2008/0209013 A1 | 8/2008 | Weel |
| 2008/0228945 A1 | 9/2008 | Yoon et al. |
| 2008/0235632 A1 | 9/2008 | Holmes |
| 2008/0242221 A1 | 10/2008 | Shapiro et al. |
| 2008/0242280 A1 | 10/2008 | Shapiro et al. |
| 2008/0243733 A1 | 10/2008 | Black |
| 2008/0244681 A1 | 10/2008 | Gossweiler et al. |
| 2008/0250067 A1 | 10/2008 | Svendsen |
| 2008/0250312 A1 | 10/2008 | Curtis |
| 2008/0270561 A1 | 10/2008 | Tang et al. |
| 2008/0276279 A1 | 11/2008 | Gossweiler et al. |
| 2008/0288588 A1 | 11/2008 | Andam et al. |
| 2008/0301118 A1 | 12/2008 | Chien et al. |
| 2008/0301186 A1 | 12/2008 | Svendsen |
| 2008/0301187 A1 | 12/2008 | Svendsen |
| 2008/0301240 A1 | 12/2008 | Svendsen |
| 2008/0301241 A1 | 12/2008 | Svendsen |
| 2008/0306826 A1 | 12/2008 | Kramer et al. |
| 2008/0307462 A1 | 12/2008 | Beetcher et al. |
| 2008/0307463 A1 | 12/2008 | Beetcher et al. |
| 2008/0313541 A1 | 12/2008 | Shafton et al. |
| 2008/0319833 A1 | 12/2008 | Svendsen |
| 2009/0006368 A1 | 1/2009 | Mei et al. |
| 2009/0006374 A1 | 1/2009 | Kim et al. |
| 2009/0007198 A1 | 1/2009 | Lavender et al. |
| 2009/0013347 A1 | 1/2009 | Ahanger et al. |
| 2009/0042545 A1 | 2/2009 | Avital et al. |
| 2009/0046101 A1 | 2/2009 | Askey et al. |
| 2009/0048992 A1 | 2/2009 | Svendsen et al. |
| 2009/0049030 A1 | 2/2009 | Svendsen et al. |
| 2009/0049045 A1 | 2/2009 | Askey et al. |
| 2009/0055385 A1 | 2/2009 | Jeon et al. |
| 2009/0055396 A1 | 2/2009 | Svendsen et al. |
| 2009/0055467 A1 | 2/2009 | Petersen |
| 2009/0055759 A1 | 2/2009 | Svendsen |
| 2009/0069911 A1 | 3/2009 | Stefik |
| 2009/0069912 A1 | 3/2009 | Stefik |
| 2009/0070184 A1 | 3/2009 | Svendsen |
| 2009/0070350 A1 | 3/2009 | Wang |
| 2009/0076881 A1 | 3/2009 | Svendsen |
| 2009/0077041 A1 | 3/2009 | Eyal et al. |
| 2009/0077052 A1 | 3/2009 | Farrelly |
| 2009/0077124 A1 | 3/2009 | Spivack et al. |
| 2009/0077220 A1 | 3/2009 | Svendsen et al. |
| 2009/0083116 A1 | 3/2009 | Svendsen |
| 2009/0083117 A1 | 3/2009 | Svendsen et al. |
| 2009/0083362 A1 | 3/2009 | Svendsen |
| 2009/0083541 A1 | 3/2009 | Levine |
| 2009/0089288 A1 | 4/2009 | Petersen |
| 2009/0093300 A1 | 4/2009 | Lutnick et al. |
| 2009/0094248 A1 | 4/2009 | Petersen |
| 2009/0119294 A1 | 5/2009 | Purdy et al. |
| 2009/0125588 A1 | 5/2009 | Black et al. |
| 2009/0129671 A1 | 5/2009 | Hu et al. |
| 2009/0132527 A1 | 5/2009 | Sheshagiri et al. |
| 2009/0157795 A1 | 6/2009 | Black |
| 2009/0164199 A1 | 6/2009 | Amidon et al. |
| 2009/0164429 A1 | 6/2009 | Svendsen et al. |
| 2009/0164514 A1 | 6/2009 | Svendsen et al. |
| 2009/0164516 A1 | 6/2009 | Svendsen et al. |
| 2009/0164641 A1 | 6/2009 | Rogers et al. |
| 2009/0177301 A1 | 7/2009 | Hayes |
| 2009/0259621 A1 | 10/2009 | Svendsen et al. |
| 2010/0031366 A1 | 2/2010 | Knight et al. |
| 2010/0185732 A1 | 7/2010 | Hyman |
| 2010/0198767 A1 | 8/2010 | Farrelly |
| 2010/0199218 A1 | 8/2010 | Farrelly et al. |
| 2011/0016483 A1 | 1/2011 | Opdycke |
| 2011/0034121 A1 | 2/2011 | Ng et al. |

FOREIGN PATENT DOCUMENTS

| | | |
|---|---|---|
| EP | 1536352 A1 | 6/2005 |
| EP | 1835455 A1 | 9/2007 |
| GB | 2372850 A | 9/2002 |
| GB | 2397205 A | 7/2004 |
| JP | 2005-321668 | 11/2005 |
| WO | 01/84353 A3 | 11/2001 |
| WO | 02/21335 A1 | 3/2002 |
| WO | 2004/017178 A2 | 2/2004 |
| WO | 2004/043064 A1 | 5/2004 |
| WO | 2005/026916 A2 | 3/2005 |
| WO | 2005/071571 A1 | 8/2005 |
| WO | 2006075032 A1 | 7/2006 |
| WO | 2006/126135 A2 | 11/2006 |
| WO | 2007092053 A1 | 8/2007 |

OTHER PUBLICATIONS

"Instant Messenger—AIM—Instant Message Your Online Buddies for Free—AIM," http://dashboard.aim.com/aim, copyright 2007 AOL LLC, printed Nov. 8, 2007, 6 pages.

"Outlook Home page—Microsoft Office Online," http://office.microsoft.com/en-us/outlook/default.aspx, copyright 2007 Microsoft Corporation, printed Nov. 8, 2007, 1 page.

"Thunderbird—Reclaim your inbox," http://www.mozilla.com/en-US/thunderbird/, copyright 2005-2007 Mozilla, printed Nov. 8, 2007, 2 pages.

"RYM FAQ—Rate Your Music," http://rateyourmusic.com/faq/, copyright 2000-2007 rateyourmusic.com, printed Nov. 8, 2007, 14 pages.

"Trillian (software)—Wikipedia, the free encyclopedia," http://en.wikipedia.org/wiki/Trillian_(instant_messenger), printed Nov. 8, 2007, 11 pages.

"Not safe for work—Wikipedia, the free encyclopedia," http://en.wikipedia.org/wiki/Work_safe, printed Nov. 8, 2007, 2 pages.

"Zune.net—How-To—Share Audio Files Zune to Zune," http://web.archive.org/web/20070819121705/http://www.zune.net/en-us/support/howto/z . . . , copyright 2007 Microsoft Corporation, printed Nov. 14, 2007, 2 pages.

"LAUNCHcast Radio—Yahoo! Messenger," http://messenger.yahoo.com/launch.php, copyright 2007 Yahoo! Inc., printed Nov. 8, 2007, 1 page.

"Goombah—Preview," http://www.goombah.com/preview.html, printed Jan. 8, 2008, 5 pages.

"Apple—iPod classic," http://www.apple.com/ipodclassic/, printed Oct. 26, 2007, 1 page.

"IEEE 802.11—Wlkipedia, the free encyclopedia," http://en.wikipedia.org/wiki/IEEE_802.11, printed Oct. 26, 2007, 5 pages.

"Bluetooth.com—Learn," http://www.bluetooth.com/Bluetooth/Learn/, copyright 2007 Bluetooth SIG, Inc., printed Oct. 26, 2007, 1 page.

"How many songs are in your iTunes Music library (or libraries in total, if you use more than one)?," http://www.macoshints.com/polls/index.php?pid=itunesmusiccount, printed Feb. 24, 2010, copyright 2010 Mac Publishing LLC, 10 pages.

"Identifying iPod models," http://support.apple.com/kb/HT1353, printed Feb. 24, 2010, 13 pages.

Mitchell, Bradley, "Cable Speed—How Fast is Cable Modem Internet?," http://www.compnetworking.about.com/od/internetaccessbestuses/f/cablespeed.htm, printed Feb. 24, 2010, 2 pages.

"What is the size of your physical and digital music collection?," http://www.musicbanter.com/general-music/47403-what-size-your-physical-digital-music-collection-12.html, printed Feb. 24, 2010, copyright 2010 Advameg, Inc., 6 pages.

"Hulu—About," www.hulu.com/about/product_tour, copyright 2010 Hulu LLC, printed Jun. 15, 2010, 2 pages.

Nilson, Martin, "id3v2.4.0-frames—ID3.org," http://www.id3.org/id3v2.4.0-frames, Nov. 1, 2000, copyright 1998-2009, printed Jun. 15, 2010, 31 pages.

"Songbird," http://getsongbird.com/, copyright 2010 Songbird, printed Jun. 15, 2010, 2 pages.

"SongReference," http://songreference.com/, copyright 2008, SongReference.com, printed Jun. 15, 2010, 1 page.

"Gracenote Playlist Plus" Product Overview, from www.gracenote.com, Dec. 29, 2005, 2 pages.

Cai, Rui et al., "Scalable Music Recommendation by Search," Proc. ACM Multimedia, Augsburg, Germany, Sep. 2007, pp. 1065-1074.

"Gracenote Playlist," Revised Dec. 29, 2005, copyright 2005 Gracenote, 2 pages.

"MyStrands Download," http://www.mystrands.com/overview.vm, copyright 2003-2007 MediaStrands, Inc., printed Feb. 7, 2007, 3 pages.

"Take a look at the Future of Mobile Music :: MUSIC GURU," http://www.symbian-freak.com/news/006/02/music_guru.htm, Feb. 23, 2006, copyright 2005 Symbian freak, printed Feb. 7, 2007, 3 pages.

"MyStrands for Windows 0.7.3 Beta" downloaded from Internet <http://www.shareapple.com/172-MyStrandsWindowsPAD.htm> on Jul. 18, 2007.

"MyStrands for Windows Change Log" downloaded from Internet <http://www.mystrands.com/mystrands/windows/changelog.vm>.

"Last.fm—Wikipedia, the free encyclopedia," http://en.wikipedia.org/wiki/Last.fm, last modifed on Aug. 8, 2006, printed Aug. 8, 2006, 7 pages.

"Mercora—Music Search and Internet Radio Network," www.mercora.com/overview.asp, copyright 2004-2006 Mercora, Inc., printed Aug. 8, 2006, 1 page.

"Last.fm—The Social Music Revolution," http://www.last.fm/, printed Feb. 7, 2007, 2 pages.

"MyStrands for Windows," http://www.mystrands.com/overview.vm, copyright 2003-2007 MediaStrands, Inc., printed Feb. 7, 2007, 3 pages.

Linder, Brad, "Muziic media player streams audio from YouTube—for now—Download Squad," http://www.downloadsquad.com/2009/03/09/muziic-media-player-streams-audio-from-you . . . , Mar. 9, 2009, copyright 2003-2009 Weblogs, Inc., printed Jun. 14, 2010, 2 pages.

"uPlayMe.com Meet People, Music Sharing—About Us," http://www.uplayme.com/about.php, copyright 2008 uPlayMe, Inc., printed Mar. 26, 2009, 4 pages.

"uPlayMe.com Meet People, Music Sharin—Home," http://www.uplayme.com/, copyright 2008 uPlayMe, Inc., printed Mar. 26, 2009, 1 page.

Wang, Jun et al., "Music Recommender System for Wi-Fi Walkman," Delft University of Technology, date unknown, 23 pages.

Barrie-Anthony, Steven, "That song sounds familiar," Los Angeles Times, Feb. 3, 2006, available from http://www.calendarlive.com/printedition/calendar/cl-et-pandora3feb03,0,7458778.story?track=tottext,0,19432.story?track=tothtml, 5 pages.

Kosugi, Naoko et al., "A Practical Query-By-Humming System for a Large Music Database," Oct. 2000, International Multimedia Conference, Proceedings of the 8th ACM International Conference on Multimedia, copyright 2000 ACM, pp. 333-342.

Yahoo! Music Archive for Jun. 20, 2005, 14 pages.

Huang, Yao-Chang et al., "An Audio Recommendation System Based on Audio Signature Description Scheme in MPEG-7 Audio," IEEE International Conference on Multimedia and Expo (ICME), copyright 2004 IEEE, pp. 639-642.

"ChoiceStream Technology Brief, Review of Personalization Technologies: Collaborative Filtering vs. ChoiceStream's Attributized Bayesian Choice Modeling," date unknown, 13 pages.

Golbeck, Jennifer, "Trust and Nuanced Profile Similarity in Online Social Networks," available from http://www.cs.umd.edu/~golbeck/publications.shtml, 2008, 30 pages.

Mascia, Jeff et al, "Lifetrak: Music In Tune With Your Life," copyright 2006, 11 pages.

"Mongomusic.com—The Best Download mp3 Resource and Information. This website is for sale!,"http://www.mongomusic.com/, printed May 17, 2007, 2 pages.

"UpTo11.net—Music Recommendations and Search," http://www.upto11.net/, copyright 2005-2006 Upto11.net, printed Feb. 7, 2007, 1 page.

"MUSICSTRANDS.COM Because Music is Social," copyright 2006 MusicStrands, Inc., 2 pages.

"Babulous :: Keep it loud," http://www.babulous.com/home.jhtml, copyright 2009 Babulous, Inc., printed Mar. 26, 2009, 2 pages.

"MixxMaker: The Mix Tape Goes Online—AppScout," http://www.appscout.com/2008/01/mixxmaker_the_mixtape_goes_onl_1.php, copyright 1996-2009 Ziff Davis Publishing Holdings Inc., printed Aug. 3, 2009, 3 pages.

"Tour's Profile," http://mog.com/Tour, copyright 2006-2009 Mog Inc., printed Aug. 3, 2009, 11 pages.

"Ringo: Social Information Filtering for Music Recommendation," http://jolomo.net/ringo.html, printed Aug. 3, 2009, 1 page.

Yahoo! Music downloaded archival page from www.archive.org for Jun. 20, 2005, copyright 2005 Yahoo! Inc., 14 pages.

"Amazon.com: Online Shopping for Electronics, Apparel, Computers, Books, DVDs & m . . . ," http://www.amazon.com/, copyright 1996-2007 Amazon.com, Inc., printed Oct. 26, 2007, 4 pages.

"betterPropaganda—Free MP3s and music videos.," http://www.betterpropaganda.com/, copyright 2004-2005 betterPropaganda, printed Feb. 7, 2007, 4 pages.

"Billboard.biz—Music Business—Billboard Charts—Album Sales—Concert Tours," http://www.billboard.biz/bbbiz/index.jsp, copyright 2007 Nielsen Business Media, Inc., printed Oct. 26, 2007, 3 pages.

"The Classic TV Database—Your Home for Classic TV!—www.classic-tv.com," http://www.classic-tv.com, copyright The Classic TV Database—www.classic-tv.com, printed Feb. 7, 2007, 3 pages.

"Digital Tech Life >> Download of the Week," http://www.digitaltechlife.com/category/download-of-the-week/, printed Feb. 16, 2007, 9 pages.

"MP3 music download website, eMusic," http://www.emusic.com/, copyright 2007 eMusic.com Inc., printed Feb. 7, 2007, 1 page.

"GenieLab::Music Recommendation System," http://web.archive.org/web/20060813000442/http://genielab.com/, copyright 2005 GenieLab, LLC printed Oct. 26, 2007, 1 page.

"The Daily Barometer—GenieLab.com grants music lovers' wishes," http://media.barometer.orst.edu/home/index.cfm?event=displayArticlePrinterFriendly&uSt . . . , copyright 2007 The Daily Barometer, printed Feb. 16, 2007, 2 pages.

"Gracenote," http://www.gracenote.com, printed Feb. 7, 2007, 1 page.

"iLikeTM—Home," http://www.ilike.com/, copyright 2007 iLike, printed May 17, 2007, 2 pages.

"The Internet Movie Database (IMDb)," http://www.imdb.com/, copyright 1990-2007 Internet Movie Database Inc., printed Feb. 7, 2007, 3 pages.

"Apple —iPod + iTunes," http://www.apple.com/itunes/, copyright 2007 Paramount Pictures, printed Feb. 7, 2007, 2 pages.

"LimeWire—Wikipedia, the free encyclopedia," http://en.wikipedia.org/wiki/LimeWire, printed Aug. 8, 2006, 2 pages.

"liveplasma music, movies, search engine and discovery engine," http://www.liveplasma.com, printed May 17, 2007, 1 page.

"Loomia—Personalized Recommendations For Media, Content and Retail Sites," http://www.loomia.com/, copyright 2006-2007 Loomia Inc., printed Feb. 7, 2007, 2 pages.

"Mercora—Music Search and Internet Radio Network," http://www.mercora.com/v6/_front/web.jsp, printed Feb. 7, 2007, 1 page.

"Welcome to the MUSICMATCH Guide," http://www.mmguide.musicmatch.com/, copyright 2001-2004 Musicmatch, Inc., printed Feb. 7, 2007, 1 page.

"Music Recommendations 1.0—MacUpdate," http://www.macupdate.com/info.php/id/19575, printed Feb. 16, 2007, 1 page.

"MusicGremlin," http://www.musicgremlin.com/StaticContent.aspx?id=3, copyright 2005, 2006, 2007 MusicGremlin, Inc., printed Oct. 26, 2007, 1 page.

"MusicIP—The Music Search Engine," http://www.musicip.com/, copyright 2006-2007 MusicIP Corporation, printed Feb. 7, 2007, 1 page.

"Digital Music News," http://www.digitalmusicnews.com/results?title=musicstrands, copyright 2003-6 Digital Music News, printed Aug. 8, 2006, 5 pages.

"MyStrands for Windows 0.7.3 Beta," copyright 2002-2006 ShareApple.com networks, printed Jul. 16, 2007, 3 pages.

"MyStrands for Windows Change Log," http://www.mystrands.com/mystrands/windows/changelog.vm, printed Jul. 16, 2007, 6 pages.

"Napster—All the Music You Want," http://www.napster.com/using_napster/all_the_music_you_want.html, copyright 2003-2006 Napster, LLC, printed Feb. 7, 2007, 2 pages.

"Try Napster free for 7 Days—Play and download music without paying per song.," http://www.napster.com/choose/index.html, copyright 2003-2007 Napster, LLC, printed Feb. 7, 2007, 1 page.

"FAQ," http://blog.pandora.com/faq/, copyright 2005-2006 Pandora Media, Inc., printed Aug. 8, 2006, 20 pages.

"Pandora Internet Radio—Find New Music, Listen to Free Web Radio," http://www.pandora.com/, copyright 2005-2007 Pandora Media, Inc., printed Feb. 7, 2007, 1 page.

"Pandora Radio—Listen to Free Internet Radio, Find New Music," http://www.pandora.com/mgp, copyright 2005-2007 Pandora Media, Inc., printed Oct. 26, 2007, 1 page.

"Rhapsody—Full-length music, videos and more—Free," http://www.rhapsody.com/welcome.html, copyright 2001-2007 Listen.com, printed Feb. 7, 2007, 1 page.

Badrul M. Sarwar et al., "Recommender Systems for Large-scale E-Commerce: Scalable Neighborhood Formation Using Clustering," 2002, 6 pages.

"Soundflavor," http://www.soundflavor.com/, copyright 2003-2007 Soundflavor, Inc., printed Feb. 7, 2007, 1 page.

"that canadian girl >> Blog Archive >> GenieLab," http://www.thatcanadiangirl.co.uk/blog/2005/02/22/genielab/, copyright 2007 Vero Pepperrell, printed Feb. 16, 2007, 3 pages.

"Webjay—Playlist Community," http://www.webjay.org/, copyright 2006 Yahoo! Inc., printed Feb. 7, 2007, 5 pages.

"Wired News:," http://www.wired.com/news/digiwoo/1,57634-0.html, copyright 2005 Lycos, Inc., printed Oct. 9, 2006, 3 pages.

"Yahoo! Messenger—Chat, Instant message, SMS, PC Calls and More," http://messenger.yahoo.com/webmessengerpromo.php, copyright 2007 Yahoo! Inc., printed Oct. 26, 2007, 1 page.

"Yahoo Music Jukebox—Wikipedia, the free encyclopedia," http://en.wikipedia.org/wiki/Yahoo_music_engine, printed Aug. 8, 2006, 1 page.

"Music Downloads—Over 2 Million Songs—Try It Free—Yahoo! Music," http://music.yahoo.com/ymu/default.asp, copyright 2006 Yahoo! Inc., printed Feb. 7, 2007, 1 page.

"MyStrands Labs: Patent-pending Technologies," at <http://labs.mystrands.com/patents.html>, printed Feb. 7, 2007, 5 pages.

Wang, J. et al., "Wi-Fi Walkman: A wireless handhold that shares and recommend music on peer-to-peer networks," in Proceedings of Embedded Processors for Multimedia and Communications II, part of the IS&T/SPIE Symposium on Electronic Imaging 2005, Jan. 16-20, 2005, San Jose, California, Proceedings published Mar. 8, 2005, found at <http://citeseerx.ist.psu.edu/viewdoc/download-?doi=10.1.1.108.3459&rep=rep1&type=pdf>, 10 pages.

\* cited by examiner

ATTRIBUTE

| | | A | B | C | D | E | F | G | H |
|---|---|---|---|---|---|---|---|---|---|
| | A | 0 | $D_{AB}$ | $D_{AC}$ | $D_{AD}$ | $D_{AE}$ | $D_{AF}$ | $D_{AG}$ | $D_{AH}$ |
| | B | $D_{BA}$ | 0 | $D_{BC}$ | $D_{BD}$ | $D_{BE}$ | $D_{BF}$ | $D_{BG}$ | $D_{BH}$ |
| | C | $D_{CA}$ | $D_{CB}$ | 0 | $D_{CD}$ | $D_{CE}$ | $D_{CF}$ | $D_{CG}$ | $D_{CH}$ |
| ATTRIBUTE | D | $D_{DA}$ | $D_{DB}$ | $D_{DC}$ | 0 | $D_{DE}$ | $D_{DF}$ | $D_{DG}$ | $D_{DH}$ |
| | E | $D_{EA}$ | $D_{EB}$ | $D_{EC}$ | $D_{ED}$ | 0 | $D_{EF}$ | $D_{EG}$ | $D_{EH}$ |
| | F | $D_{FA}$ | $D_{FB}$ | $D_{FC}$ | $D_{FD}$ | $D_{FE}$ | 0 | $D_{FG}$ | $D_{FH}$ |
| | G | $D_{GA}$ | $D_{GB}$ | $D_{GC}$ | $D_{GD}$ | $D_{GE}$ | $D_{GF}$ | 0 | $D_{GH}$ |
| | H | $D_{HA}$ | $D_{HB}$ | $D_{HC}$ | $D_{HD}$ | $D_{HE}$ | $D_{HF}$ | $D_{HG}$ | 0 |

D=DISTANCE

*FIG. 3*

SYSTEM AND METHOD FOR AUTOMATICALLY AND GRAPHICALLY ASSOCIATING PROGRAMMATICALLY-GENERATED MEDIA ITEM RECOMMENDATIONS RELATED TO A USER'S SOCIALLY RECOMMENDED MEDIA ITEMS

RELATED APPLICATIONS

This application is a continuation of U.S. patent application Ser. No. 11/696,849, filed Apr. 5, 2007, entitled SYSTEM AND METHOD FOR AUTOMATICALLY AND GRAPHICALLY ASSOCIATING PROGRAMMATICALLY-GENERATED MEDIA ITEM RECOMMENDATIONS RELATED TO A USER'S SOCIALLY RECOMMENDED MEDIA ITEMS, the disclosure of which is hereby incorporated herein by reference in its entirety.

FIELD OF THE DISCLOSURE

The present disclosure relates to a system and method for automatically and graphically associating programmatically-generated media item recommendations on a user interface based on media items selected from a user's social or "friend" media item recommendation list.

BACKGROUND

In recent years, there has been an enormous increase in the amount of digital media available online. Services, such as Apple's iTunes® for example, enable users to legally purchase and download music. Other services, such as Yahoo!® Music Unlimited and RealNetwork's Rhapsody® for example, provide access to millions of songs for a monthly subscription fee. YouTube® provides users access to video media. As a result, media items have become much more accessible to consumers worldwide. However, the increased accessibility of media has only heightened a long-standing problem for the media industry, which is namely the issue of linking users with media that matches their preferences.

Many companies, technologies, and approaches have emerged to address this issue of media recommendation. Media item recommendations may be provided to users as suggestions based on information about the user and/or their media likes or dislikes, also called preferences. In this manner, the user is more likely to respond, such as by purchase, to media item recommendations. Media item recommendations may be provided either by service provider companies, or "socially" by the user's online "friends" (typically identified by user id).

In the case of socially or friend recommended media items, the user typically receives the recommended media items through a client application executing on the user's personal computer or other networked device. The networked device communicates with other networked devices to receive the friend recommendations. When the friend recommendations are received, the user can display the recommendations on a graphical user interface (GUI). The friend recommendations are typically presented to the user in the form of a media item table having a plurality of columns, wherein title or other identifying information about the user's media items is graphically presented. The media item table may contain all of the user's media collection, including recommended items and non-recommended media items. Recommended media items may be signified by the user id or name of "friend" or user that recommended the media item to the user.

It may also be desirable to provide company recommended media items to a user in addition to friend recommendations. Company media item recommendations are typically programmatically provided, meaning they are provided based on a programmed methodology, algorithm, or other scheme. For example, company provided media item recommendations may be provided based on a holistic classification of assigning ratings to attributes of the user's media collection. Alternatively, company media item recommendations may be based on a communal approach, wherein recommendations are based on the collective wisdom of a group of users with similar tastes by profiling the habits of a particular user and then searching similar profiles of other users. In either case, company or programmatically-generated media item recommendations allow the user to be presented with additional recommendations for a greater variety of media options relevant to the user. Companies also benefit in that they may obtain additional opportunities for revenues generated if the user desires to purchase a company recommended media item.

The user's client application typically intermingles friend and programmatically-generated media item recommendations into the user's media collection. The user may desire to separately distinguish friend media item recommendations from programmatically-generated media item recommendations for ease in browsing and/or selection. However, if friend media item recommendations are isolated, the user may lose the benefit of being presented and browsing highly related programmatically-generated media item recommendations.

A tradeoff may exist. Either the user is presented all media item recommendations, both friend and programmatically-generated, for browsing and/or selection. Or, the user chooses to only browse one set of media item recommendations thereby losing visual access to the other. The present disclosure addresses this tradeoff by allowing the user to select a media item from among a list of friend media item recommendations while at the same time automatically and associatively being presented a separate list of related, programmatically-generated media item recommendations to the selected media item. In this manner, the user can browse and select friend media item recommendations while at the same time being presented with automatically updated, programmatically-generated related media item recommendations.

SUMMARY

The present disclosure is a system and method for automatically and programmatically generating media item recommendations for visual display on a graphical user interface (GUI) based on a user-selected friend media item recommendation. The GUI allows a user to browse through a stream or list of friend media item recommendations, with the most recent media selection by the user being placed in a highlighted focus area on the GUI. The friend media item recommendation list is visually displayed adjacent the focus area by order of relation or likeness to the selected media item recommendation in the focus area on the GUI. A separate stream or list of programmatically-generated media item recommendations is automatically generated and visually displayed adjacent the focus area also by order of relation or likeness to the selected media item recommendation in the focus area on the GUI. In this manner, the user can browse friend media item recommendations, while at the same time being automatically presented with updated and programmatically-generated media item recommendations most closely related to the selected media item recommendation in the focus area of the GUI. This allows the user to easily and visually identify, browse, and/or select the most related or closest in likeness, but alternative media item selections to the selected media item recommendation in the focus area of the GUI at anytime.

In a main exemplary embodiment of the present disclosure, friend media item recommendations are displayed in a series of media item icons in a friend media item recommendation list visually displayed in a horizontal axis on each side of the selected media item in the focus area of the GUI. The friend media item recommendations most closely related by likeness to the selected media item are displayed in icons immediately proximate on both sides of the focus area. The less closely related friend media item recommendations are displayed in icons farther away and in descending relational order from the selected media item in the focus area in the horizontal axis. In this manner, the user may traverse the icons in the friend media item recommendation list in order of relevance to the selected media item in the focus area in a first axis.

As the user horizontally traverses the friend media item recommendation list and selects icons representing different media item recommendations to be displayed in the focus area, a programmatically-generated media item recommendation list is automatically generated. The programmatically-generated media item recommendation list is a stream of icons visually located and displayed in a vertical axis intersecting the focus area on the GUI. Like the friend media item recommendation list, the most closely related media items by likeness to the user-selected media item, among the programmatically-generated media item recommendation list, are displayed in icons immediately proximate on the top and bottom sides of the focus area. The less closely related programmatically-generated media item recommendations are displayed in icons farther away in descending relational order from the highlighted area in the vertical axis.

In this manner, the user is automatically and visually provided with additional programmatically-generated media item recommendations related to friend media item recommendations selected for the focus area in an opposing axis. The user can, at any time, easily switch from one axis to the other, to traverse between the friend media item recommendation list and the programmatically-generated media item recommendation list, wherein each traverse provides the next most relevant media item recommendation in its list to the currently selected media item in the focus area.

The user can also simply place or roll their mouse over a particular media item of interest in either list on the GUI. Additional information about the media item is exposed in a separate window on the GUI as a result to allow the user to easily consider the potential selection. If the user clicks the mouse when the cursor is on top of a media item selection not in the focus area, the media item selected will be moved to the focus area. The other media items in the lists are shifted. Optionally, the friend recommendation media item list may be reordered based on a determined closest or likeness relationship of the selected programmatically-generated media item to the media items among the friend media item recommendations.

Any relational model, including a relational or likeness scoring model, may be employed by the present disclosure to determine the most closely related or most alike friend media item recommendations and the programmatically-generated media item recommendations to the selected media item recommendation in the focus area. A model may be used to rank the lists by likeness, where the media item recommendations located immediately adjacent the focus area were determined to be most like the selected media item recommendation. Likeness or lack thereof can also be measured in terms of distance. The friend media item recommendations may be relationally determined or scored to determine their relational order to the selected media item recommendation when displayed on the GUI in a friend media item recommendation list. The relational scoring may also be based in part on the user's preferences, which may be configured by the user using a client application to provide preferences for weightings for attributes that go to determining relation or likeness. This client application may also control displaying and updating the recommendation lists on the GUI.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 illustrates a graphical user interface (GUI) providing a user selected media item in a focus area and providing related friend and programmatically-generated media item recommendation lists in different axes intersecting with the focus area;

FIG. 2 is a flow chart illustrating the basic operation of one embodiment of the present disclosure for providing and displaying friend and programmatically-generated media item recommendations in opposing axes on a GUI, and automatically updating the selected media item and the associated, and related according to likeness, recommendations displayed on the GUI when a new media item selection is made by the user;

FIG. 3 is a chart illustrating one embodiment of how a likeness distance rating or score may be determined to control the relational order of friend and programmatically-generated media item recommendation lists displayed on the GUI;

Figure 5A:
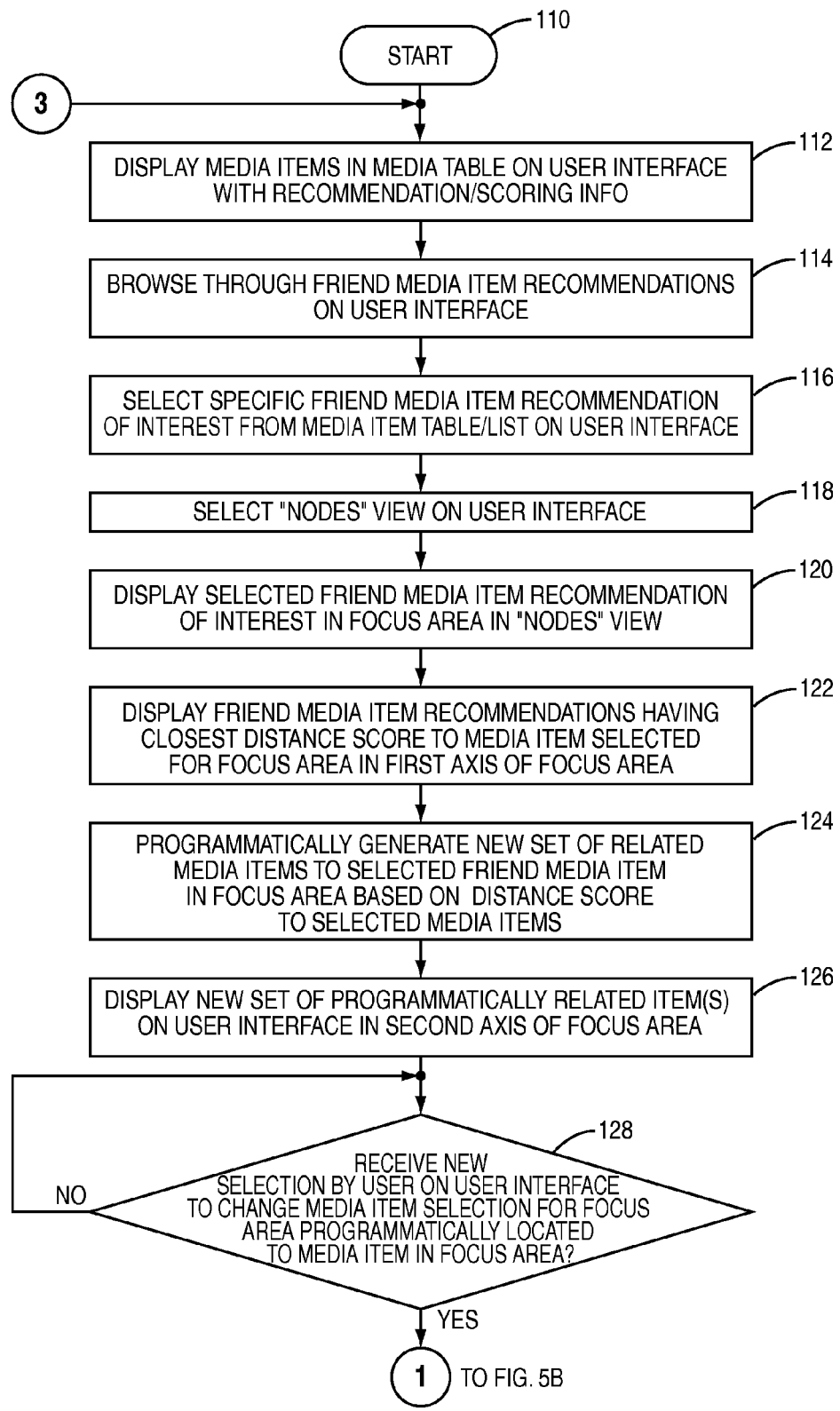
Figure 5B:
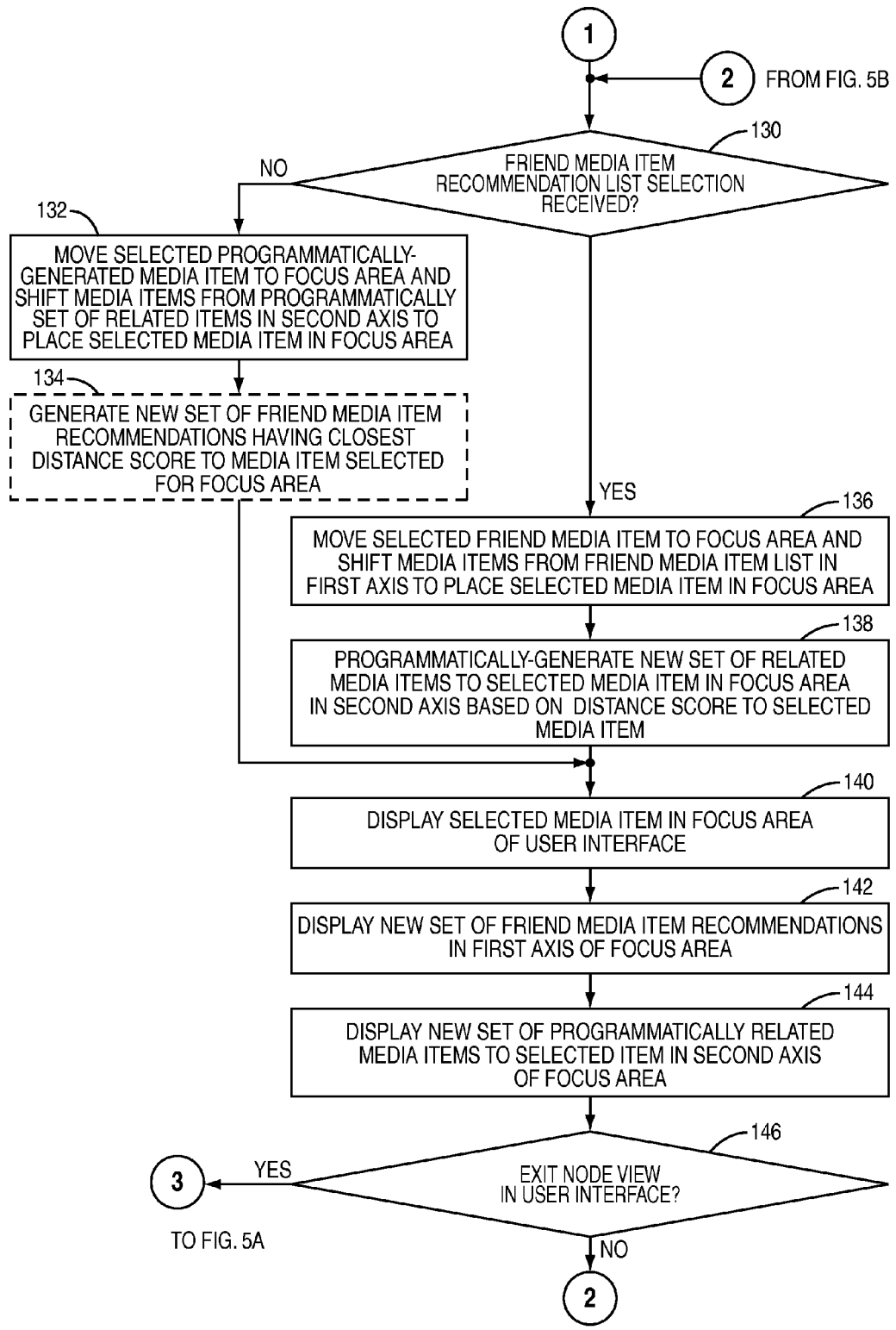
Figure 6:
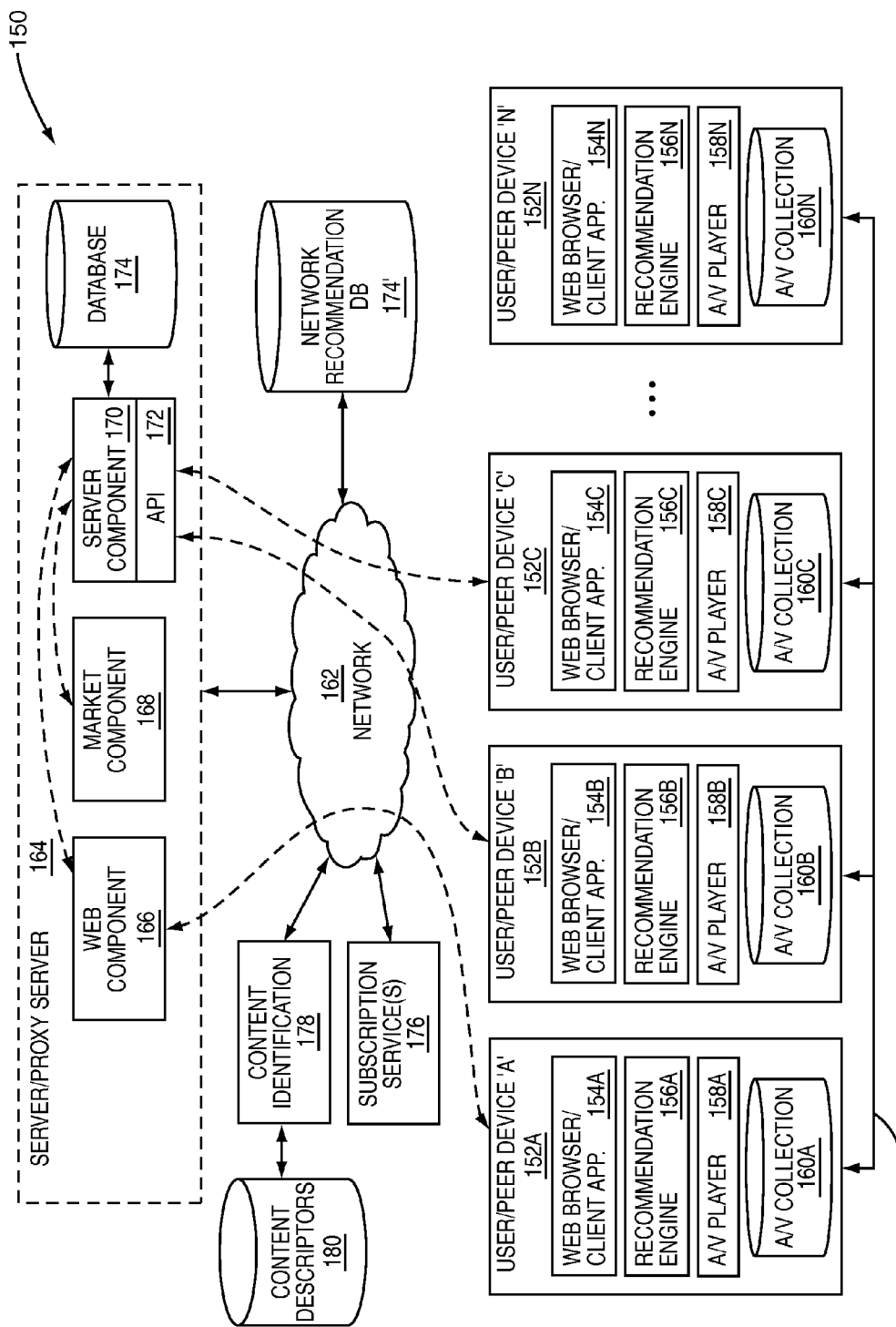
Figure 7:
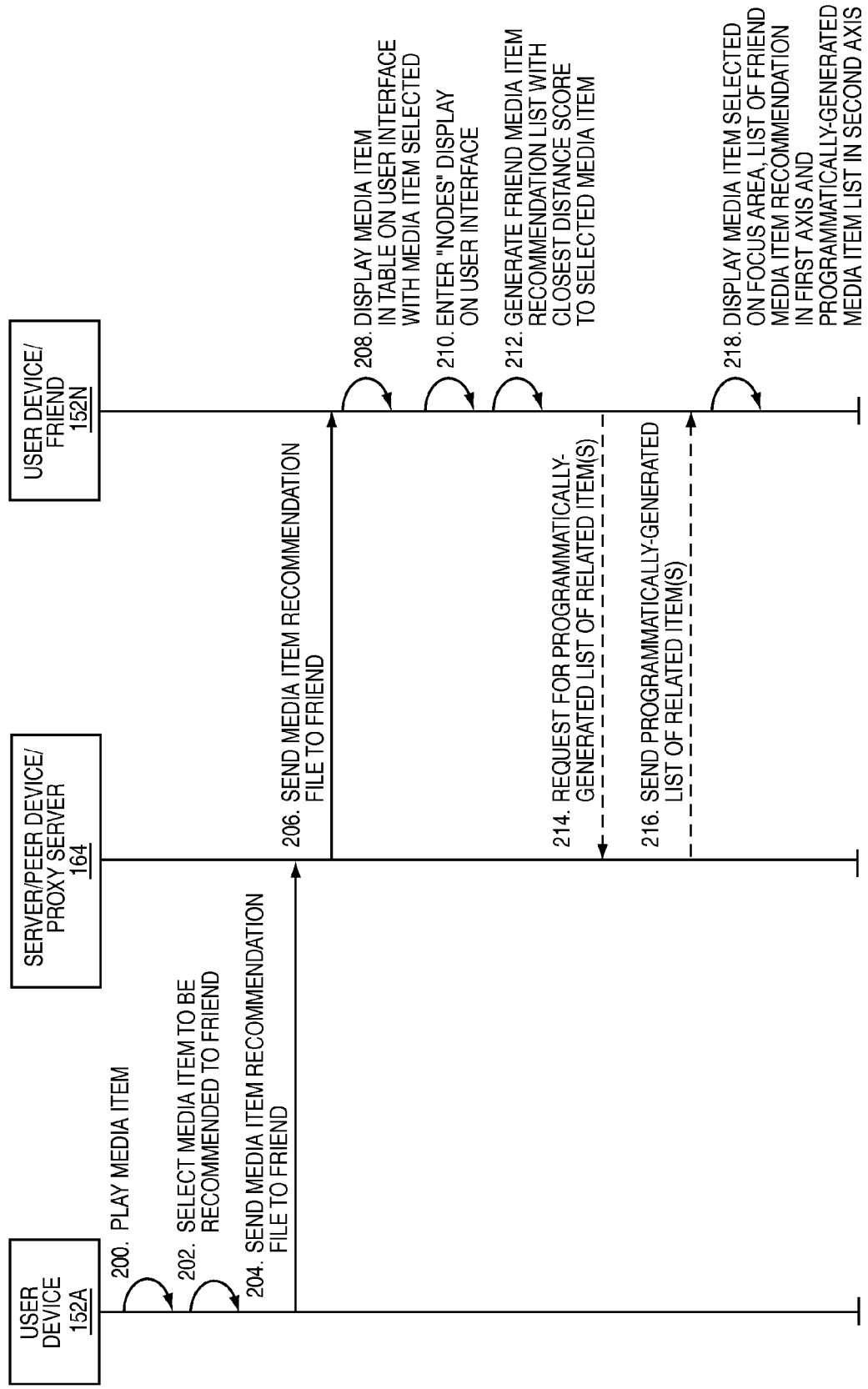
Figure 8:
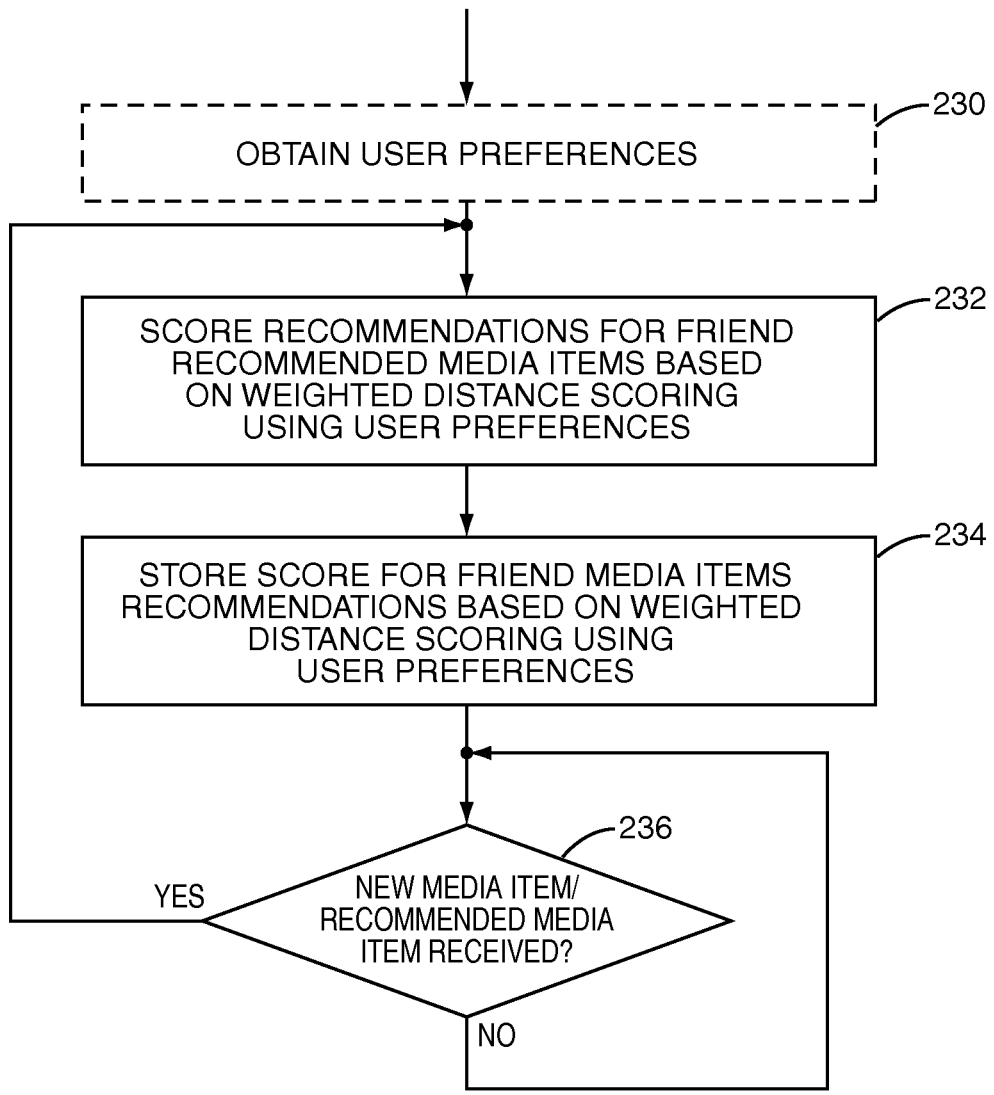
Figure 9:
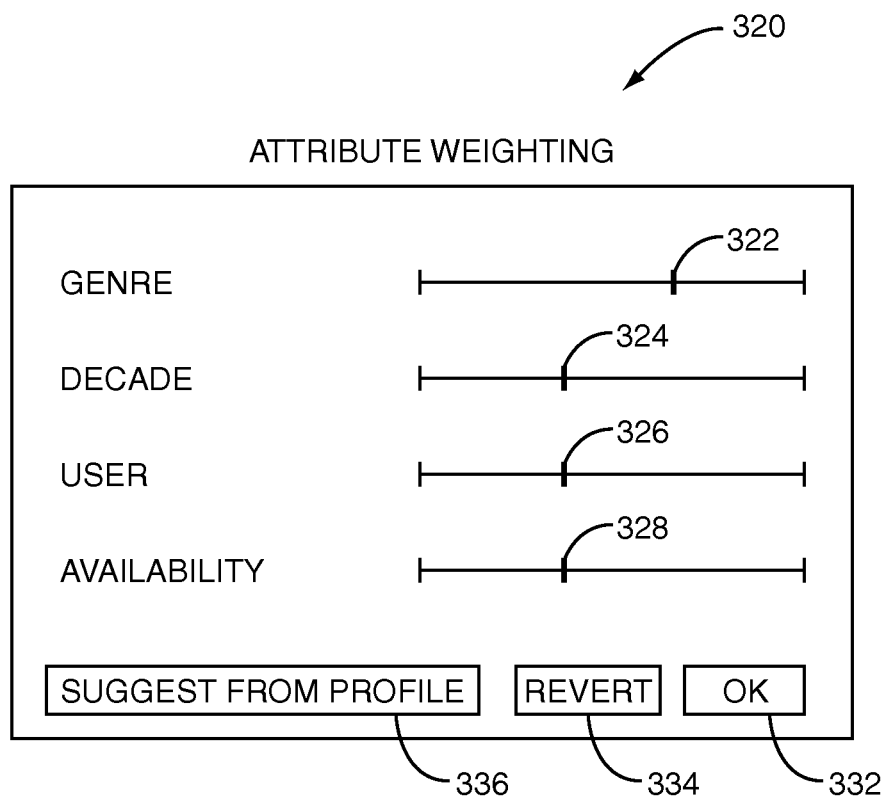

FIGS. 5A and 5B are flowcharts illustrating a more detailed operation of one embodiment of the present disclosure for providing and displaying a selected media item recommendation and related friend and programmatically-generated media item recommendations in opposing axes on a GUI, and automatically updating the selected media item and the associated, and related according to likeness, recommendation list displayed on the user interface when a new media item selection is made by a user;

FIG. 6 illustrates a user-server system for providing and receiving friend media item recommendations, for determining and receiving programmatically-generated media item recommendations, and for displaying related recommendations on a GUI to a user;

FIG. 7 is an exemplary communication flow diagram between user devices and a server illustrated in FIG. 6 for receiving friend media item recommendations to determine and automatically provide programmatically-generated media item recommendations for displaying to a user on a GUI in accordance with the present disclosure;

FIG. 8 is a flowchart illustrating one embodiment of a relational or distance scoring model, wherein a user's preferences are used to influence attributes used in the relational scoring model; and FIG. 9 illustrates an exemplary GUI for assigning weights to various categories of media items as part of configuring the user preferences to influence the relational scoring model.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present disclosure is a system and method for automatically and programmatically generating media item recommendations for visual display on a graphical user interface (GUI) based on a user-selected friend media item recommendation. The GUI allows a user to browse through a stream or list of friend media item recommendations, with the most recent media selection by the user being placed in a highlighted focus area on the GUI. The friend media item recommendation list is visually displayed adjacent the focus area by order of relation or likeness to the selected media item recommendation in the focus area on the GUI. A separate stream or list of programmatically-generated media item recommendations is automatically generated and visually displayed adjacent the focus area also by order of relation or likeness to the selected media item recommendation in the focus area on the GUI. In this manner, the user can browse friend media item recommendations, while at the same time being automatically presented with updated and programmatically-generated media item recommendations most closely related to the selected media item recommendation in the focus area of the GUI. This allows the user to easily and visually identify, browse, and/or select the most related or closest in likeness, but alternative media item selections to the selected media item recommendation in the focus area of the GUI at anytime.

In a main exemplary embodiment of the present disclosure, friend media item recommendations are displayed in a series of media item icons in a friend media item recommendation list visually displayed in a horizontal axis on each side of the selected media item in the focus area of the GUI. The friend media item recommendations most closely related by likeness to the selected media item are displayed in icons immediately proximate on both sides of the focus area. The less closely related friend media item recommendations are displayed in icons farther away and in descending relational order from the selected media item in the focus area in the horizontal axis. In this manner, the user may traverse the icons in the friend media item recommendation list in order of relevance to the selected media item in the focus area in a first axis.

As the user horizontally traverses the friend media item recommendation list and selects icons representing different media item recommendations to be displayed in the focus area, a programmatically-generated media item recommendation list is automatically generated. The programmatically-generated media item recommendation list is a stream of icons visually located and displayed in a vertical axis intersecting the focus area on the GUI. Like the friend media item recommendation list, the most closely related media items by likeness to the user-selected media item, among the programmatically-generated media item recommendation list, are displayed in icons immediately proximate on the top and bottom sides of the focus area. The less closely related programmatically-generated media item recommendations are displayed in icons farther away in descending relational order from the highlighted area in the vertical axis.

In this manner, the user is automatically and visually provided with additional programmatically-generated media item recommendations related to friend media item recommendations selected for the focus area in an opposing axes. The user can, at any time, easily switch from one axis to the other, to traverse between the friend media item recommendation list and the programmatically-generated media item recommendation list, wherein each traverse provides the next most relevant media item recommendation in its list to the currently selected media item in the focus area.

Figure 1:
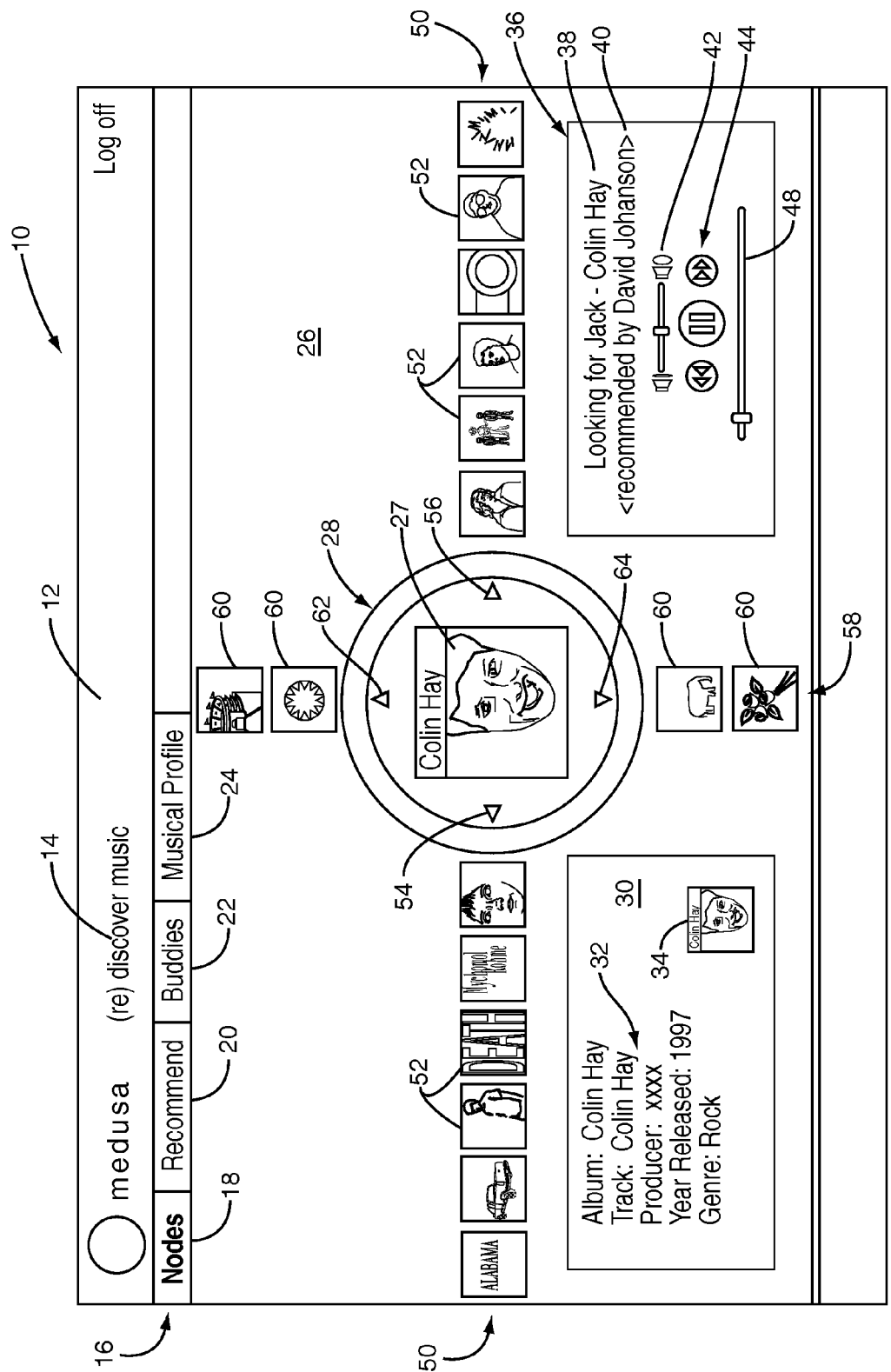
Figure 2:
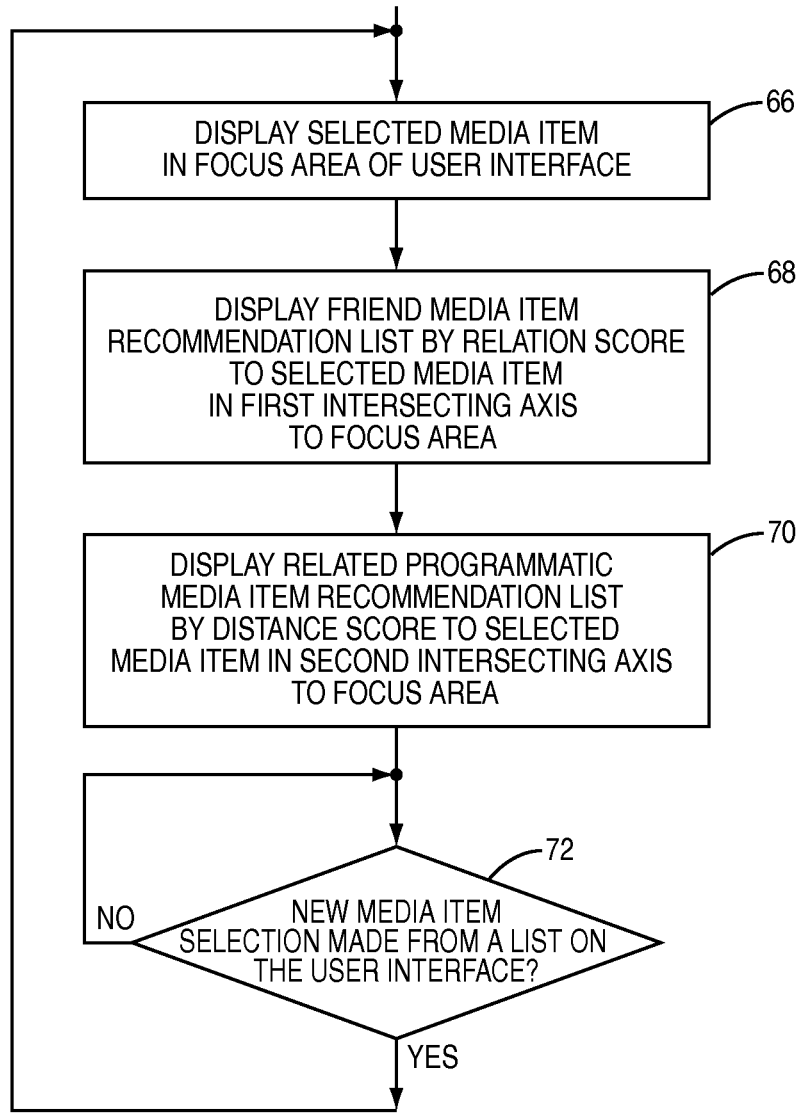

An example of a GUI for displaying friend and programmatically-generated media item recommendation lists according to the present disclosure is illustrated in FIG. 1. Reference to the flowchart illustrated in FIG. 2 is also made where relevant to the description of the GUI illustrated in FIG. 1. As illustrated in FIG. 1, the GUI may be comprised of a media item recommendation window or screen 10 that contains several components. For instance, the window 10 may contain a banner area 12 at the top of the window 10 for displaying information about the application, such as a program code name 14. The program code name 14 may be user configurable. A menu bar 16 may provide one or more user selectable menus 18, 20, 22, 24 provided to allow the user to select different display options in the window 10, and/or navigate between different screens within the window 10 for providing media item related functions. FIG. 1 illustrates a "Nodes" menu 18 being selected, which is the display type displayed in the window 10 in FIG. 1. The "Nodes" menu 18 is selected by the user in the illustrated example for displaying the friend and programmatically-generated media item recommendations on the GUI in accordance with the present disclosure.

The friend and programmatically-generated media item recommendations are displayed in a main display area 26 in the window 10. In the illustrated embodiment, the media items displayed are audio or track media items. However, the media items are not limited to audio media items, and may be video, audio/visual, presentations, or any other type of media content. A currently selected media item recommendation 27 by the user is displayed in a focus area 28, which is centered in the window 10 in the exemplary embodiment (step 66, FIG. 2). The currently selected media item recommendation 27 remains in the focus area 28 until another media item is selected by the user. In the illustrated example, the selected media item recommendation 27 is a track from the album "Colin Hay." More information about the selected media item recommendation 27 is displayed in an information window 30 within the main window 10. Media item information 32 is displayed about the selected media item recommendation 27. For example, the album name, the recommended track, the producer, the year released, and the genre may be displayed along with a thumbnail 34 of the selected media item recommendation 27.

Audio play controls may be provided in an audio play control window 36 within the main window 10 to allow a user to control playing of the selected media item recommendation 27 in the focus area 28. The name of the media item recommendation track is provided in a name field 38. The user that recommended the media item recommendation track is located in a recommended user field 40. In this manner, the user can see the name of the "friend" that recommended the selected media item recommendation 27. A volume control 42, play controls 44 (typically consisting of forward, reverse, and pause), and a progress bar 48 indicating where in the total duration of the media item and where in the track play is currently occurring, may also be provided as illustrated in FIG. 1.

In this exemplary embodiment, friend media item recommendations are displayed in a friend media item recommendation list 50, which is displayed adjacent to the focus area 28 in a horizontal axis in the illustrated example (step 68, FIG. 2). The friend media item recommendation list 50 is comprised of a plurality of friend media item recommendations represented by icons 52. The entire friend media item recommendation list 50 may not be fully illustrated due to window 10 size limitations. In the illustrated example, the friend recommendation icons 52 are album covers representing various albums. The actual friend media item recommendations 52 are tracks on albums.

The user can traverse the friend media item recommendations 52 in several manners. If the user desires to traverse among the friend media item recommendations 52, the user can select either a left arrow 54 or a right arrow 56 located in the focus area 28. In response, the friend media item recommendation list 50, represented by the icons 52 in the illustrated example, is shifted right or left, respectively, in the window 10. In this manner, the user is able to visually traverse through the friend media item recommendations 52 as desired. If the user shifts the friend media item recommendation list 50 enough times in one direction, previously unseen friend media item recommendation icons 52 that could not originally fit within the list 50 in the window 10 will appear, since the friend media item recommendation list 50 is shifted linearly.

If the user desires to select a particular friend media item recommendation 52 from the friend media item recommendation list 50, the user clicks their mouse while the cursor is located over top the media item 52 (step 72, FIG. 2). The media item 52 selected is immediately moved to the focus area 28 as providing the currently selected media item recommendation 27. The friend media item recommendation list 50 is also automatically shifted and/or reordered in the horizontal axis so that the media items icons 52 are maintained in their relational order by most closely related or closest in likeness to the selected media item recommendation 27 in the focus area 28. The friend media item recommendations 52 are displayed in relational order to each other and to the selected media item recommendation 27 according to a scoring system or model, as will be described later in this application. The most closely related friend media items recommendations 52 to the selected media item recommendation 27 are displayed immediately proximate to the selected media item recommendation 27. The next closely related media item recommendations 52 are displayed farther away from the focus area 28 in descending order of relation. In this manner, the user knows that each traversal through the friend media item recommendations 52 in the list 50 is displaying the next most related media item recommendation 52 to the selected media item recommendation 27.

If the user simply wants to find out more information about a particular friend media item recommendation 52 without browsing or selecting the media item 52, the user can also hold their mouse icon over the desired friend media item recommendation icon 52. In response, a pop-up window (not shown) will appear in window 10 to provide identifying information, such as in the example of song media items, the album name, the recommended track name, the producer, the year released, and the genre.

In the exemplary embodiment and in response to an initial or user selected friend media item recommendation 52, programmatically-generated media item recommendations are automatically generated and displayed in the window 10 according to a scored relation to the selected media item recommendation 27 displayed in the focus area 28 (step 70, FIG. 2). The programmatically-generated media item recommendations are displayed in a programmatically-generated media item recommendation list 58, which is displayed adjacent the focus area 28 in a vertical intersecting axis to the focus area 28 in the illustrated example. In this manner, the user is automatically and visually provided with additional programmatically-generated media item recommendations 60 most closely related or closest in likeness to the selected media item recommendation 27 according to a relational model. In this embodiment, the programmatically-generated media item recommendation list 58 is displayed in an opposing axis to the friend media item recommendation list 50. The programmatically-generated media item recommendation list 58 intersects the currently selected media item recommendation 27 as does the friend media item recommendation list 50 such that both lists 50, 58 can easily be traversed by a user in the window 10.

Similar to the friend media item recommendation list 50, the programmatically-generated media item recommendation list 58 is comprised of individual programmatically-generated media items 60, shown in the form of icons, that are automatically generated and associatively displayed according to a closest relation or closest likeness to the selected media item recommendation 27 in the focus area 28. A programmatically-generated media item recommendation 60 is simply a media item recommendation that was not received by a "friend," but instead algorithmically generated according to a relational or associative algorithm in order to provide other relevant and closely related media item recommendations 60 to the currently selected media item recommendation 27 for the user in addition to friend media item recommendations 52.

An algorithm, program, or other scheme may be employed to determine the most closely related or closest by likeness media items to the currently selected media item recommendation 27 to form the programmatically-generated media item recommendation list 58. One method of determining relation or likeness between a media item recommendation 52, 60 and the currently selected media item recommendation 28 is by determining the difference in the two in terms of "distance." For example, a distance of nothing or '0' means no difference, or the same media item. A higher distance rating exhibits a greater degree of difference or less likeness than a lower distance rating. The less distance between two media items, the more closely related they are. Attributes are selected that are representative of distance or likeness. The media items are then compared for distance by comparing the degree of differences between their respective attributes. FIG. 3 illustrates an example of a distance rating system.

As illustrated in FIG. 3, a number of attributes may be selected to judge likeness or distance between two media items. In the example of a song media item in particular, these attributes for determining likeness may be, for example, the media item's:

Artist
Release Year
Genre
Content Distributor (label)
Composer
Encoding Time
Parental Rating
Producer
BeatsPerMinute Conductor
InitialKey
Lyrics
Mood
Publisher
Recommender The attributes may be aligned in a distance chart along both of its axes. A distance rating would be filled into a table entry based on the distance between the two attributes intersecting the table entry. A lower rating indicates less distance, or greater likeness, between two given attributes in a table entry between the two song media items. So, determining the distance, and thus the likeness, between two song media items could be a summation of the distance between the individual attributes provided in the model, or table in the example of FIG. 3. The actual attributes used in the model could be any attributes that are designated as being related to relation or likeness, and could include the attributes listed above by example, or any other attributes desired.

With regard to the present disclosure, a distance rating like that or similar to the one described above may be employed to determine the order of media item recommendations 60 visually displayed for the programmatically-generated media item recommendations list 58, with the media item recommendations 60 having the lowest distance rating being located immediately adjacent or proximate both sides of the currently selected media item recommendation 27 in the focus area 28. The next closest in distance or next less closely related programmatically-generated media item recommendations 60 are displayed in icons 52 farther away in descending relational or distance order from the selected media item recommendation 27. In this manner, the user is automatically and visually provided with additional, programmatically-generated media item recommendations 60 most closely related or closest in likeness to the selected media item recommendation 27. The user can, at any time, easily switch from one axis to the other to traverse between the friend media item recommendation list 50 and the programmatically-generated media item recommendation list 58, wherein each traversal provides the next most relevant media item recommendation 52, 60 in its list 50, 58 to the currently selected media item recommendation 27 in the focus area 28.

Similar to the friend media item recommendation list 50, the user can traverse the programmatically-generated media item recommendation list 58 in several manners. If the user desires to traverse among the programmatically-generated media item recommendations 60, the user can select either an up arrow 62 or a down arrow 64 located in the focus area 28. In response, the programmatically-generated media item recommendation list 58, represented by the icons 60 in the illustrated example, is shifted up or down, respectively, in the window 10. The user is able to visually traverse through the programmatically-generated media item recommendations 60 according to their desire. If the user shifts the programmatically-generated media item recommendation list 58 enough times in one direction, previously unseen programmatically-generated media item recommendation icons 60 that could not originally fit within the list 58 in the window 10 will appear, since the programmatically-generated media item recommendation list 58 is shifted linearly.

Similar to the friend media item recommendation list 50, if the user desires to select a particular media item 60 from the programmatically-generated media item recommendation list 58, the user clicks their mouse while the cursor is located over top the desired media item 60 for selection (step 72, FIG. 2). A media item 60 selected is immediately moved to the focus area 28. The programmatically-generated media item recommendation list 58 is also automatically shifted and/or reordered in the vertical axis so that the media items icons 60 are maintained in their proper relational order with respect to each other and the selected media item recommendation 27 in the focus area 28. The programmatically-generated media item recommendations 60 are displayed in relational order to each other according to a most closely related scoring system or model, as will be described later in this application. The most closely related programmatically-generated media items recommendations 60 to the selected media item recommendation 27 by likeness are displayed immediately proximate to the selected media item recommendation 27, with the next most closely relevant programmatically-generated media item recommendations 60 displayed farther away in descending order of relation. In this manner, the user knows that each traversal through the programmatically-generated media item recommendation list 58 is displaying the next most closely related media item 60 to the currently selected media item recommendation 27.

In the preferred embodiment, the friend recommendation media item list 50 is not reordered if the user selects a programmatically-generated media item 60 to be displayed as the selected media item recommendation 27 in the focus area 28. In an alternative embodiment, the friend recommendation media item list 50 is reordered based on its likeness relation to the selected programmatically-generated media item recommendation 27 in the focus area 28.

In summary, FIG. 1 provides a GUI that visually displays a selected media item recommendation 27 in a focus area 28. Friend media item recommendations are provided in a series or list that are displayed in a first adjacent area or axis in order or closest relation or likeness to the selected media item recommendation 27. Friend media item recommendations 52 most closely related to or like the selected media item recommendation 27 in the focus area 28 are displayed in icons immediately proximate on both sides of the focus area 28. Less closely related friend media item recommendations 52 are displayed in icons farther away in descending relational order from the focus area 28 in the horizontal axis. In this manner, the user can traverse the icons 52 in the friend media item recommendation list 50 in order of scored relationship to the selected media item recommendation 27 in the focus area 28.

As the user horizontally traverses the friend media item recommendation list 50 and selects icons 52 representing different media item recommendations 27 to be displayed in the focus area 28, the programmatically-generated media item recommendation list 58 is automatically generated. The programmatically-generated media item recommendation list 58 is a stream of icons 60 visually located and displayed in a different, such as vertical, axis intersecting the focus area 28 on the GUI. Like the friend media item recommendation list 50, the closest related or most like media items, among the programmatically-generated media item recommendation list 58, to the selected media item recommendation 27 in the focus area 28 are displayed in icons immediately proximate on both sides of the focus area 28. The less closely related, programmatically-generated media item recommendations 60 are displayed in icons farther away in descending relational order from the focus area 28 in the vertical axis.

In this manner, the user is automatically and visually provided with additional programmatically-generated media item recommendations 60 related to the friend media item recommendations 52 selected for the focus area 28 in an opposing axis. The user can, at any time, easily switch from one axis to the other, to traverse between the friend media item recommendation list 50 and the programmatically-generated media item recommendation list 58, wherein each traversal provides the next most closely related media item recommendation in its list 50, 58 to the currently selected media item recommendation 27 in the focus area 28. Note that the media item recommendation lists 50, 58 can be visually displayed in any area adjacent the focus area 28 and are not limited to being displayed in axes, including horizontal and vertical axes respective to the focus area 28.

Figure 4:
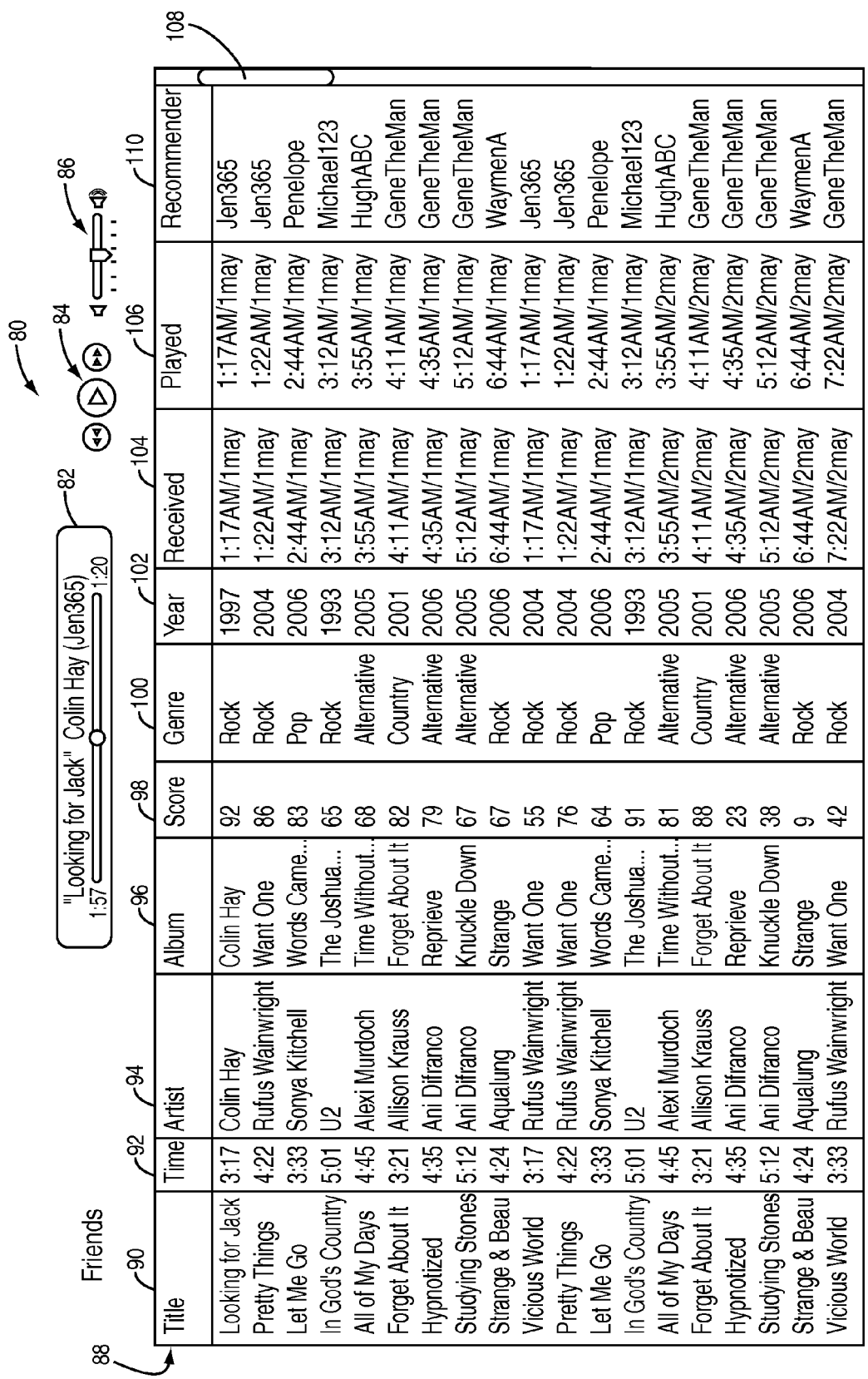
FIG. 4 illustrates an example of a media client application executing on a user's device for displaying a user's media collection including stored media item recommendations that may be used to provide the recommendation lists on the GUI.

FIG. 4 illustrates an example of an alternative media item display to the "Nodes" display menu selection 18 in FIG. 1. This view may be provided by a GUI to display media items in the user's collection, including recommended media items, in a table format to illustrate how media item recommendations are typically scored when the user's collection is not displayed in the "Nodes" view. The media item table in FIG. 4 illustrates how media item recommendations may be displayed to the user prior to the novel display system and method provided by the present disclosure.

As illustrated in FIG. 4, a main media collection page or window 80 is provided. The current media item being played by the user is shown in a currently playing box 82. In this example, the media items are music or songs. The current media item being played may be the initial selected media item recommendation 27 displayed in the focus area if the user were to switch from the media collection window 80 to the "Nodes" view, via "Nodes" menu 18, for example. User controls 84 are provided to allow the user to control an audio/video (A/V) player, such as reversing, forwarding, and playing selected items. A volume slide control 86 is also provided to allow the user to control the volume of an A/V player.

Media items that are either populated from a server, or from the user's A/V collection, or both and sent to the client application are listed in a media item table 88. The media item table 88 is a music item table 88 and consists of numerous columns that provide key information about the media items to the user. A title column 90 provides the title of the music item. A time column 92 provides the length or duration of the music item when played. An artist column 94 provides the artist of the music item. An album column 96 provides the name of the album the song was included on. A score column 98 provides a score in terms of importance to the user according to their user preferences stored as a result of the registration process and/or determined by a server based on the owned media items in the user's A/V collection. This score illustrated in score column 98 is typically different than the relational score used to display media items in a "Nodes" view, like illustrated in FIG. 1. For example, the track "Looking for Jack" by Colin Hay, which was recommended by user "Jen365" has the highest score of "92" based on the user's preferences fed into the scoring model.

A genre column 100, a year column 102, a received time and date column 104, and a played column 106 provide the genre type, the year of release, the date and time of receipt, and the date and time of the last play of the music item, respectively. A scroll bar 108 is available for the user to scroll up and down through their song items.

A recommender column 110 contains a user id or name of the person or friend that recommended the media item to the user. The user can establish a list of friends that are able to provide friend recommendations as disclosed in U.S. patent application Ser. No. 11/484,130 entitled "P2P NETWORK FOR PROVIDING REAL TIME MEDIA RECOMMENDATIONS," previously referenced above. The user is able to navigate the media item table 88 by "point and click" to play items, download items, and request content from a server and/or other sources.

The flow charts in FIGS. 5A and 5B illustrate another embodiment of the how the present disclosure may be performed. For example, the process is illustrated starting from when a user initially selects the "Nodes" menu 18, as in the example of FIG. 1, to display the friend and programmatically-generated media item recommendation lists 50, 58 in different axes. Further, an exemplary process by which the friend and programmatically-generated media item recommendation lists 50, 58 are updated when a user makes a new media item recommendation selection to display as the currently selected media item recommendation 27 in the focus area 28 is set forth.

As illustrated in FIG. 5A, the process starts (step 110), and media items are displayed in the media item table 88 on the GUI with recommendation scoring information calculated and provided (step 112). The user is able to browser through the media items, including the friend media item recommendations 52, in the media item table 88 (step 114). The user then selects a specific friend media item recommendation 52 of interest from the media item table 88 on the GUI (step 116). In order for the user to change the GUI to the "Nodes" display format, an example of which is illustrated in FIG. 1, the user may select a "Nodes" view or menu 18 (step 118). In this manner, the media item selected by the user from the media item table 88 is displayed is the initial selected media item recommendation 27 displayed in the focus area 28 (step 120) on the GUI.

Next, the friend media item recommendations 52 having the closest distance or likeness scores to the selected media item recommendation 27 are displayed immediately proximate to the focus area 28 (step 122). The next closest or closest in likeness or distance friend media item recommendations 52 are displayed next, and so on, until the friend media item recommendation list 50 is displayed in the main window 10 (step 122). Other media item recommendations 60 related to the selected media item recommendation 27 in the focus area 28 are programmatically-generated and displayed in different or opposing vertical axis to the friend media item recommendation list 50 and intersecting the focus area 28 based on a relational scoring system. The scoring system identifies the closest related programmatically-generated media item recommendations 60, as previously described (steps 124, 126).

If a new media item recommendation selection is made by the user, from one of the recommendation lists 50, 58 in the window 10 (decision 128), the process continues to FIG. 5B, where it is determined if the selection is from the friend media item recommendation list 50 or the programmatically-generated media item recommendation list 58 (decision 130). If from the programmatically-generated media item recommendation list 58, the programmatically-generated selected item 60 is moved to the focus area 28, and the programmatically-generated media item recommendations 60 are shifted accordingly (step 132). Optionally, as discussed above, the friend media item recommendation list 50 may be reordered to display friend media item recommendations 52 having the closest relational score or likeness to the selected programmatically-generated media item recommendations 60 selected for the focus area 28 (step 134).

If, in decision 130, a friend media item recommendation 52 is selected by the user from the friend media item recommendation list 50, the selected friend media recommendation item 52 is moved to the focus area 28 (step 134). The friend media item recommendation list 50 is shifted accordingly (step 136). A new programmatically-generated media item recommendation list 58 is generated based on the new closest in likeness determination between the selected friend media item recommendation 27 and the programmatically-generated media item recommendations 60 (step 138). The programmatically-generated media item recommendations 60 may be updated locally at a client application, or remotely at a server or other peer device. After any of the recommendation lists 50, 58 are updated based on new most closely related determinations between the friend and/or programmatically-generated recommendations 52, 60 to the user-selected media item recommendation 27, the user-selected media item recommendation 27 and both recommendation lists 50, 58 are displayed by the GUI (steps 140, 142, 144). If the user exits the "Nodes" view in the GUI (decision 146), the process repeats, such as for example by the GUI displaying the media collection window 80 as illustrated in FIG. 4, by returning back to step 112 in FIG. 5A. If the user does not exit the "Nodes" view in the GUI (decision 146), the process returns back to decision 130 to await a new media item recommendation selection by the user.

In order to receive friend media item recommendations 52, the GUI is executed on a user device that is coupled to a network to other friend user devices and/or a server(s). In this manner, friend recommendations can be received from others. In addition, it may be desired to determine and/or provide the programmatically-generated media item recommendations 60 from an offsite system, such as from a server, proxy server, networked peer device, and/or a remote database. In this regard, FIG. 6 illustrates an exemplary media item recommendation system 150. One or more user devices 152 are illustrated as networked computing devices employed by a user to use and/or play media items, including friend and programmatically-generated media item recommendations 52, 60. FIG. 6 illustrates a plurality of user devices 152, namely user devices 152A, 152B, 152C, and up through including any number of user devices to 152N. The user devices 152 provide the GUI to the user as well as a networked device to receive friend and programmatically-generated media item recommendations 52, 60 from other devices and/or systems.

The user devices 152 typically contain a web browser and/or client application 154 to provide the GUI to the user. A recommendation engine 156 may be provided to handle recommendation related processing, such as the operations provided by the present disclosure. An A/V player 158 may be provided to allow the user to play and/or use media items, including recommendations. Lastly, the user devices 152 may include their own A/V collection 160, comprising media items either stored locally or accessible from a remote system over a network 162, such as the Internet, which is a TCP-IP based network.

The web browser or client application 154 can establish a connection over the network 162 to a central/proxy server 164. The server 164 can be any type of computing device that is coupled to the network 162. Examples of user devices 152 that may be used to access the server 164 and/or other users over the network 162 include, but are not limited to, personal computers, wireless portable media players (PMPs), personal digital assistants (PDAs), and the like.

The server 164 may be comprised of several components to facilitate user connections and provide media related services. These components may be comprised of a web component 166, a market component 168, and a server component 170. The server component 170 may also provide an application program interface (API) 172 to provide a downloadable client application to the user devices 152 for interfacing, ordering, and receiving media related services from the server 164 after an initial session is established between a user device 152 and the server 164 via the web browser 154, for example. A database 174 may be located on location at the server 164 for storage of data, including but not limited to media items and information relating to friend and/or programmatically-generated media item recommendations 52, 60. A network accessible database 174' may also be utilized to provide storage capabilities remote from the server 164 and/or as backup data storage, if desired.

Some media items requested and/or recommended that need to be accessed may not be stored locally in the server database 174 or the network database 174', but rather obtained from subscription services 176 via network 162 access on-demand. In this regard, network accessible subscription services 176 may be provided for user devices 152 to access media items for downloading. The server 164 and/or the user devices 152 may access the subscription services 176 over the network 162. Further, the server 164 and/or the user devices 152 can communicate over the network 162 with content identification systems 178 to provide identifying and other characteristic information about media items, such as information regarding artists, song titles, genre, etc. in the example of song content in particular. This information may be used to provide the media item information 32 for the selected media item recommendation 27 displayed in the focus area 28, as illustrated in FIG. 1. The allows access to user friendly information about media items as part of the services provided by the server 164 and/or the user devices 152. The identification systems 178 may be coupled with or contain content descriptors 180 that are compared to media items to identify and provide information regarding media items. For an example of songs in particular, the descriptors 180 may include known fingerprints and/or Global Unique IDs (GUIDs) to identify songs and obtain metadata containing information about the songs, such as title, artist, genre, etc. A uniform resource locator (URL) may be included to identify location(s) for the descriptor information.

FIG. 7 illustrates an exemplary communication flow diagram that may be employed by the media item recommendation system 150 illustrated in FIG. 6. The process may be used to send friend media item recommendations 52 as a precursor for a user receiving the media item recommendations to employ the present disclosure. In this regard, a first user may play a media item on their user device 152A using their A/V player 158A (step 200). The media item played may then be selected to be recommended to another friend user (step 202). The user device 152A sends the media item recommendation to the server 164 or peer device (step 204) destined for a recipient. The media item recommendation is then forwarded to the recipient friend, which is user device 152N in the illustrated example (step 206). Thereafter, the media item recommendation can be displayed by the user in the media item table 88, such as illustrated in FIG. 4 (step 208). The user may cause the GUI executing on the user device 152N to enter the "Nodes" display mode, as illustrated by example in FIG. 1 (step 210).

Next, the friend media item recommendation list 50 may be determined and displayed according to the closest likeness or relation to the selected media item recommendation 27 (step 212). The programmatically-generated media item recommendation list 58 is then requested offsite from the server 164 or from a peer device as examples, as an optional step (step 214). This is because the programmatically-generated media item recommendations 60 may not be provided locally at the user device 152N, and may be determined by a relational likeness or distance determination system or algorithm provided by another system on-demand, as needed. If requested, the results are returned (step 216), and the GUI displays the selected media item recommendation 27 in the focus area 28, with the friend media item recommendation list 50 displayed in a first intersecting axis and the programmatically-generated media item recommendation list 58 provided in a second intersecting axis, as previously described above and illustrated in FIG. 1 (step 218).

FIG. 8 is a flow chart illustrating an alternative embodiment of how a likeness or distance score may be assigned to media item recommendations 52, 60 in order to provide an ordered friend media item recommendation list 50 for the present disclosure. In this embodiment, the model is based in part on user-defined preferences for choosing or weighing attributes regarding media items. Other methods may be employed, and the present disclosure is not limited to use of user preferences for determining or weighting media item attributes. As discussed above, a likeness or distance model or algorithm is employed to order a users' friend media item recommendations 52 for browsing and/or selection. In this manner, the user can browse through friend media item recommendations 52 in order or likeness. In response to selection of a friend media item recommendation 52, programmatically-generated media item recommendations 60 are scored by likeness and generated based on closest relation or likeness to the selected media item recommendation 27 for display in a different axis from the friend media item recommendation list 50.

Turning to FIG. 8, the user preferences are obtained (step 230). The friend media item recommendations 52 received previously by the user from friends are scored for likeness based in part on the user's preferences for attributes used in the model (step 232). The likeness or distance is stored, typically at the user device 152, for use by the client application when needed, such as when providing the features of the present disclosure (step 234). If a new media item recommendation is received (decision 236), the process may be repeated to determine the likeness or distance of the media item recommendations 52, 60 since a new received media item recommendation could alter the order of the media item recommendations 52, 60. If a raw likeness score is used to score media item recommendations 52, 60, the process may not need to be completely repeated, but only the newly received media item recommendation be scored to determine if the recommendations 52, 60 should be reordered.

FIG. 9 is an example of a GUI 320 where a user can select the desired weights of certain media item attributes that may be used to determine likeness between two media items by adjusting corresponding sliding bars 322-330.

Once the weights are assigned, the user may select an OK button 332 to store the weighting of the media item attributes, or select a REVERT button 334 to return the weights of the categories to their previous or default settings. In addition, the user may select a SUGGEST FROM PROFILE button 336 to have the recommendation engine 156 or server 164 suggest weights for the categories based on a user profile.

It should be noted that the term "relation" in the present disclosure is mean to represent relation between two media items, whether that be based on likeness, distance, or any other relation. The term "relation" is meant to encompass any of these alternative phraseologies to compare media item recommendations in accordance with the present disclosure. These terms are used interchangeably to set forth the concept of determining the most closely related or most closely alike media items according to whatever model or scoring system is employed. The present disclosure is not limited to any particular model or scoring system. Any number of different attributes, which may or may not be influenced by a user's preferences or selections, may be used, and still be within the scope and spirit of the present disclosure.

Those skilled in the art will recognize improvements and modifications to the preferred embodiments of the present disclosure. All such improvements and modifications are considered within the scope of the concepts disclosed herein and the claims that follow.

What is claimed is:

1. A method for providing social and programmatically-generated media item recommendations to a user on a user interface, comprising the steps of:
   displaying a user-selected media item recommendation in a focus area on a user interface of a display device;
   determining a social media item recommendation list comprising one or more social media item recommendations;
   determining a programmatically-generated media item recommendation list comprising one or more programmatically-generated media item recommendations;
   displaying the social media item recommendation list in a first area on the user interface; and
   displaying the programmatically-generated media item recommendation list in a second area on the user interface different from the first area wherein the first area is a first axis, and the second area is a second axis and wherein the programmatically-generated media item recommendation list in the second axis intersects the focus area on the user interface.

2. The method of claim 1, wherein the social media item recommendation list in the first axis intersects the focus area on the user interface.

3. The method of claim 1, wherein the programmatically-generated media item recommendation list in the second axis intersects the focus area on the user interface.

4. The method of claim 1, wherein the first axis is a horizontal axis, and the second axis is a vertical axis, wherein the focus area is in substantially the center of the user interface.

5. The method of claim 1, wherein the first area is a first adjacent area to the focus area, and the second area is a second adjacent area to the focus area.

6. The method of claim 1, wherein the step of displaying the programmatically-generated media item recommendation list further comprises displaying an icon list on the user interface graphically representing the one or more programmatically-generated media item recommendations.

7. The method of claim 1, wherein the step of displaying the social media item recommendation list further comprises displaying an icon list on the user interface graphically representing the one or more social media item recommendations.

8. The method of claim 1, wherein the step of generating the programmatically-generated media item recommendation list comprises determining the relation of a set of media item recommendations to the user-selected media item recommendation.

9. The method of claim 8, wherein the relation is determined by determining a relation score between the set of media item recommendations and the user-selected media item recommendation.

10. The method of claim 9, wherein the most closely related media item recommendations, among the set of media item recommendations, to the user-selected media item recommendation are displayed closest to the user-selected media item recommendation on the user interface in the programmatically-generated media item recommendation list.

11. The method of claim 1, wherein the programmatically-generated media item recommendation list is ordered in rank of relevance to the user-selected media item recommendation.

12. The method of claim 1, further comprising automatically updating the one or more programmatically-generated media item recommendations in the programmatically-generated media item recommendation list when the user-selected media item recommendation is changed.

13. The method of claim 12, wherein the step of generating the programmatically-generated media item recommendation list comprises determining the relation of a set of media item recommendations to the user-selected media item recommendation.

14. The method of claim 1, wherein the step of generating the social media item recommendation list comprises determining the relation of the user's social media item recommendations to the user-selected media item recommendation.

15. The method of claim 12, wherein the user's most closely related social media item recommendations to the user-selected media item recommendation is displayed closest to the user-selected media item recommendation on the user interface in social media item recommendation list.

16. The method of claim 1, wherein the social media item recommendation list is ordered in rank of relevance to the user-selected media item recommendation.

17. The method of claim 16, wherein the rank of relevance is determined by determining a relation score for the user's social media item recommendations against user preference established for the user.

18. The method of claim 1, further comprising automatically updating the one or more social media item recommendations in the social media item recommendation list when the user-selected media item is changed.

19. The method of claim 18, wherein the step of generating the social media item recommendation list comprises determining the user's social media item recommendations related to the user-selected media item recommendation.

20. The method of claim 1, further comprising shifting the programmatically-generated media item recommendation list in response to receiving a user selection to traverse the programmatically-generated media item recommendation list on the user interface.

21. The method of claim 1, further comprising shifting the social media item recommendation list in response to receiving a user selection to traverse the social media item recommendation list on the user interface.

22. The method of claim 1, further comprising displaying media-related information about the user-selected media item recommendation on the user interface.

23. The method of claim 1, further comprising displaying media-related information about a social media item recommendation within the social media item recommendation list in a pop-up window on the user interface in response to receiving a cursor rollover overtop the social media item recommendation.

24. The method of claim 1, further comprising displaying media-related information about a programmatically-generated media item recommendation within the programmatically-generated media item recommendation list in a pop-up window on the user interface in response to receiving a cursor rollover overtop the programmatically-generated media item recommendation.

25. A system providing a media application for providing social and programmatically-generated media item recommendations to a user on a user interface, comprising:
a system executing a media application;
wherein the media application is adapted to:
display a user-selected media item recommendation in a focus area on a user interface;
determine a social media item recommendation list comprising one or more social media item recommendations;
determine a programmatically-generated media item recommendation list comprising one or more programmatically-generated media item recommendations;
display the social media item recommendation list in a first area on the user interface; and
display the programmatically-generated media item recommendation list in a second area on the user interface different from the first area wherein the first area is a first axis, and the second area is a second axis and wherein the programmatically-generated media item recommendation list in the second axis intersects the focus area on the user interface.

26. The system of claim 25, wherein the media application is further adapted to determine the relation of a set of media item recommendations to the user-selected media item recommendation.

27. The system of claim 26, wherein the media application is further adapted to determine the relation by determining a relation score between the set of media item recommendations and the user-selected media item recommendation.

28. The system of claim 26, wherein the media application is further adapted to display the most closely related media item recommendations, among the set of media item recommendations, to the user-selected media item recommendation on the user interface in the programmatically-generated media item recommendation list.

29. The system of claim 25, wherein the media application is further adapted to automatically update the one or more programmatically-generated media item recommendations in the programmatically-generated media item recommendation list when the user-selected media item recommendation is changed.

30. The system of claim 25, wherein the media application is further adapted to determine the relation of the user's social media item recommendations to the user-selected media item recommendation to generate the social media item recommendation list.

31. The system of claim 30, wherein the media application is further adapted to display the user's most closely related social media item recommendations to the user-selected media item recommendation on the user interface in the social media item recommendation list.

32. A user interface generated by a media application executing on a microprocessor-based user device, comprising: a focus area; a user-selected media item recommendation displayed in the focus area;
a social media item recommendation list comprising one or more social media item recommendations in a first area; and
a programmatically-generated media item recommendation list comprising one or more programmatically-generated media item recommendations in a second area different from the first area wherein the first area is a first axis, and the second area is a second axis and wherein the programmatically-generated media item recommendation list in the second axis intersects the focus area on the user interface.

33. The user interface of claim 32, wherein the social media item recommendation list in the first axis intersects the focus area on the user interface.

34. The user interface of claim 32, wherein the first area is a first adjacent area to the focus area, and the second area is a second adjacent area to the focus area.

35. The user interface of claim 32, wherein the programmatically-generated media item recommendation list further comprises an icon list on the user interface graphically representing the one or more programmatically-generated media item recommendations.

36. The user interface of claim 32, wherein the social media item recommendation list further comprises an icon list on the user interface graphically representing the one or social media item recommendations.

37. The user interface of claim 32, wherein the first axis is a horizontal axis, and the second axis is a vertical axis, wherein the focus area is in substantially the center of the user interface.

38. A non-transitory computer readable medium storing software for instructing a controller of a computing device to:
- display a user-selected media item recommendation in a focus area on a user interface of a display device;
- determine a social media item recommendation list comprising one or more social media item recommendations;
- determine a programmatically-generated media item recommendation list comprising one or more programmatically-generated media item recommendations;
- display the social media item recommendation list in a first area on the user interface; and
- display the programmatically-generated media item recommendation list in a second area on the user interface different from the first area wherein the first area is a first axis, and the second area is a second axis and wherein the programmatically-generated media item recommendation list in the second axis intersects the focus area on the user interface.

39. The system of claim 38, wherein the controller is further instructed to determine the relation of a set of media item recommendations to the user-selected media item recommendation.

40. The system of claim 39, wherein the controller is further instructed to determine the relation by determining a relation score between the set of media item recommendations and the user-selected media item recommendation.

41. The system of claim 39, wherein the controller is further instructed to display the most closely related media item recommendations, among the set of media item recommendations, to the user-selected media item recommendation on the user interface in the programmatically-generated media item recommendation list.

42. The system of claim 38, wherein the controller is further instructed to automatically update the one or more programmatically-generated media item recommendations in the programmatically-generated media item recommendation list when the user-selected media item recommendation is changed.

43. The system of claim 38, wherein the controller is further instructed to determine the relation of the user's social media item recommendations to the user-selected media item recommendation to generate the social media item recommendation list.

44. The system of claim 43, wherein the controller is further instructed to display the user's most closely related social media item recommendations to the user-selected media item recommendation on the user interface in the social media item recommendation list.

* * * * *